United States Patent
Duman

(10) Patent No.: US 9,966,876 B2
(45) Date of Patent: May 8, 2018

(54) VOLTAGE CONVERSION DEVICE

(71) Applicant: Emre Duman, Aichi (JP)

(72) Inventor: Emre Duman, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days. days.

(21) Appl. No.: 15/665,861

(22) Filed: Aug. 1, 2017

(65) Prior Publication Data

US 2018/0041106 A1 Feb. 8, 2018

(30) Foreign Application Priority Data

Aug. 2, 2016 (JP) ................. 2016-151805

(51) Int. Cl.
*H02M 3/335* (2006.01)
*H02M 7/5387* (2007.01)

(52) U.S. Cl.
CPC ..... *H02M 7/5387* (2013.01); *H02M 3/33569* (2013.01)

(58) Field of Classification Search
CPC ............. H02M 3/33569; H02M 3/335; H02M 2007/4815; H02M 2007/4818;
(Continued)

(56) References Cited

U.S. PATENT DOCUMENTS 6,188,586 B1 * 2/2001 Farrington ............ H02M 3/337
363/17
6,545,883 B2 * 4/2003 Xing ................. H02M 3/33592
363/132

(Continued)

FOREIGN PATENT DOCUMENTS

JP 2002315324 A 10/2002
JP 2003092876 A 3/2003
(Continued)

OTHER PUBLICATIONS

Shuai Jiang, et al.; "Grid Connected Boost-Half-Bridge Photovoltaic Micro Inverter System Using Repetitive Current Control and Maximum Power Point Tracking"; 2012 Twenty-Seventh Annual IEEE Applied Power Electronics Conference and Exposition (APEC), pp. 590-597; Feb. 5-9, 2012 (8 pages).

Dong Cao, et al.; "Low Cost Transformer Isolated Boost Half-bridge Micro-inverter for Single-phase Grid-connected Photovoltaic System"; 2012 Twenty-Seventh Annual IEEE Applied Power Electronics Conference and Exposition (APEC), pp. 71-78; Feb. 5-9, 2012 (8 pages).

(Continued)

*Primary Examiner* — Nguyen Tran
(74) *Attorney, Agent, or Firm* — Osha Liang LLP

(57) ABSTRACT

A voltage conversion device includes a first conversion circuit, a second conversion circuit, a voltage detection circuit, and a CPU (failure detector). The first conversion circuit switches a DC voltage at a DC power supply to convert the DC voltage into an AC voltage. The second conversion circuit rectifies the AC voltage converted with the first conversion circuit to convert the AC voltage into a DC voltage. The voltage detection circuit detects voltage at a connection point of an auxiliary switching element and a first capacitor. The CPU monitors a change in voltage at the connection point in a predetermined period, the voltage being detected with the voltage detection circuit, and detects failure that occurs in one of or both a main switching element and the auxiliary switching element during operation based on the change in the voltage.

10 Claims, 20 Drawing Sheets

(58) Field of Classification Search
CPC .. H02M 1/083; H02M 3/33507; H02M 7/521; H02M 7/5387; H02M 7/53871; H02M 7/53875; H02M 3/3155; H02M 7/537; H02M 7/5383; H02M 1/32; H02M 1/34; H02H 7/122; H02H 7/1222; H02H 7/1227
USPC ... 363/16, 17, 21.02, 21.03, 39, 40, 98, 131, 363/132, 55, 56.01, 56.02, 56.03, 56.04, 363/56.05, 56.06, 56.07, 56.08
See application file for complete search history.

(56) References Cited

U.S. PATENT DOCUMENTS

| | | |
|---|---|---|
| 2008/0074905 A1 | 3/2008 | Moiseev et al. |
| 2009/0003018 A1* | 1/2009 | Blair .................. H02M 3/3378 363/17 |
| 2010/0246215 A1 | 9/2010 | Mase et al. |
| 2014/0268908 A1 | 9/2014 | Zhou et al. |

FOREIGN PATENT DOCUMENTS

| | | |
|---|---|---|
| JP | 2003092877 A | 3/2003 |
| JP | 2003092881 A | 3/2003 |
| JP | 2007189835 A | 7/2007 |
| JP | 2007236155 A | 9/2007 |
| JP | 2007236156 A | 9/2007 |
| JP | 2008079454 A | 4/2008 |
| JP | 2009112123 A | 5/2009 |
| JP | 2010226931 A | 10/2010 |

OTHER PUBLICATIONS

Hossein Tahmasebi; "Boost Integrated High Frequency Isolated Half-Bridge DC-DC Converter: Analysis, Design, Simulation and Experimental Results"; A project Report Submitted in Partial Fulfillment of the Requirements for the Degree of Master of Engineering; University of Victoria; https://dspace.library.uvic.ca/bitstrearn/handle/1828/6427/Tahmasebi_Hossein_MEng_2015.pdf; 2015 (74 pages).

John Benson York Jr.; "An Isolated Micro-Converter for Next Generation Photovoltaic Infrastructure"; Dissertation submitted to the Faculty of the Virginia Polytechnic Institute and State University; https://vtechworks.lib.vt.edu/bitstream/handle/10919/19326/York_JB_D_2013.PDF; Apr. 19, 2013 (187 pages).

* cited by examiner

S2 gate signal

S1 gate signal $$Vc1 = \frac{D}{1-D} Vin$$

$$Vc2 = Vin$$

$$Vm = Vc1 + Vc2 = \frac{1}{1-D} Vin$$

$$Vc3 = \frac{D}{1-D} Vin * N$$

$$Vc4 = Vin * N$$

$$Vo = Vc3 + Vc4 = \frac{1}{1-D} Vin * N$$

FIG. 5A
Section A (t0 - t1)
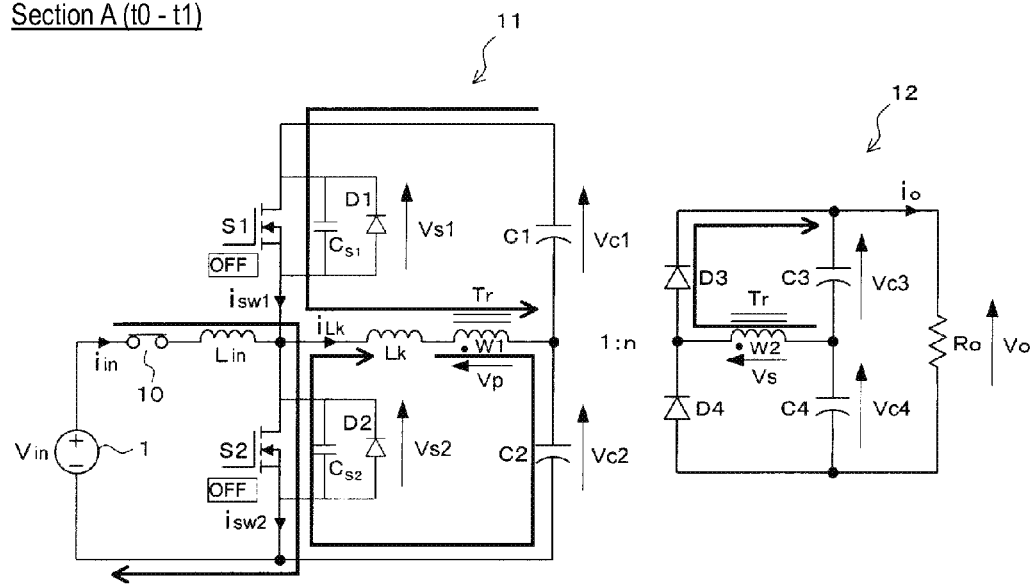
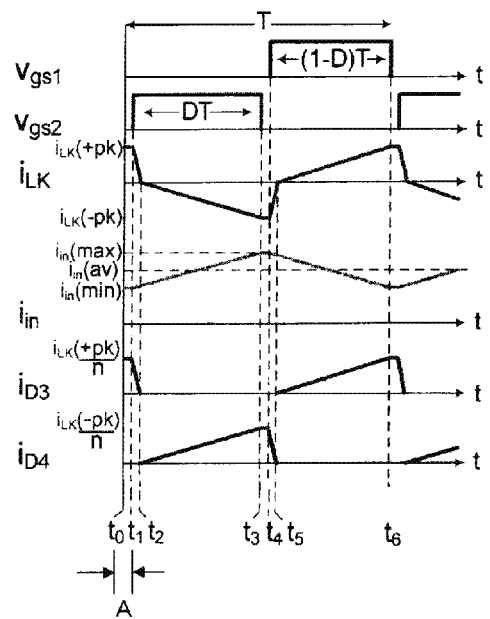

FIG. 5B
Section B (t1 – t2)
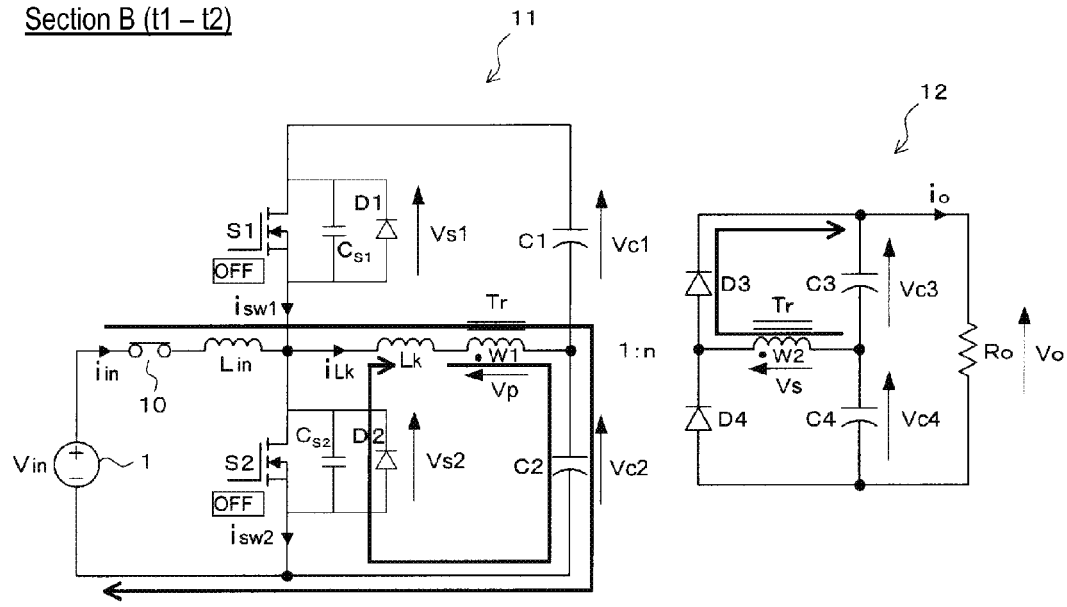
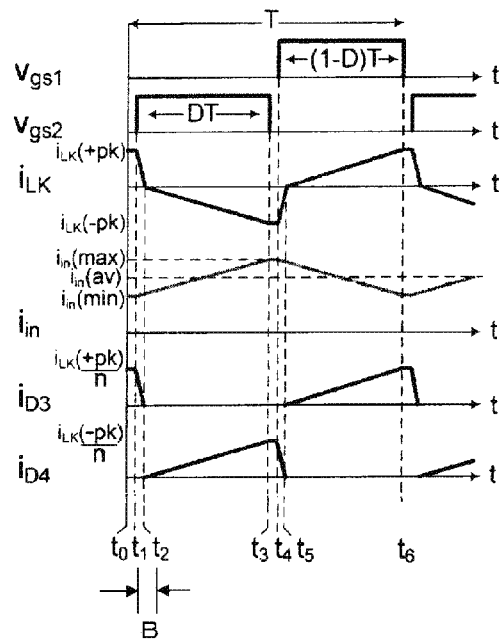

FIG. 5C
Section C (t2 – t3)
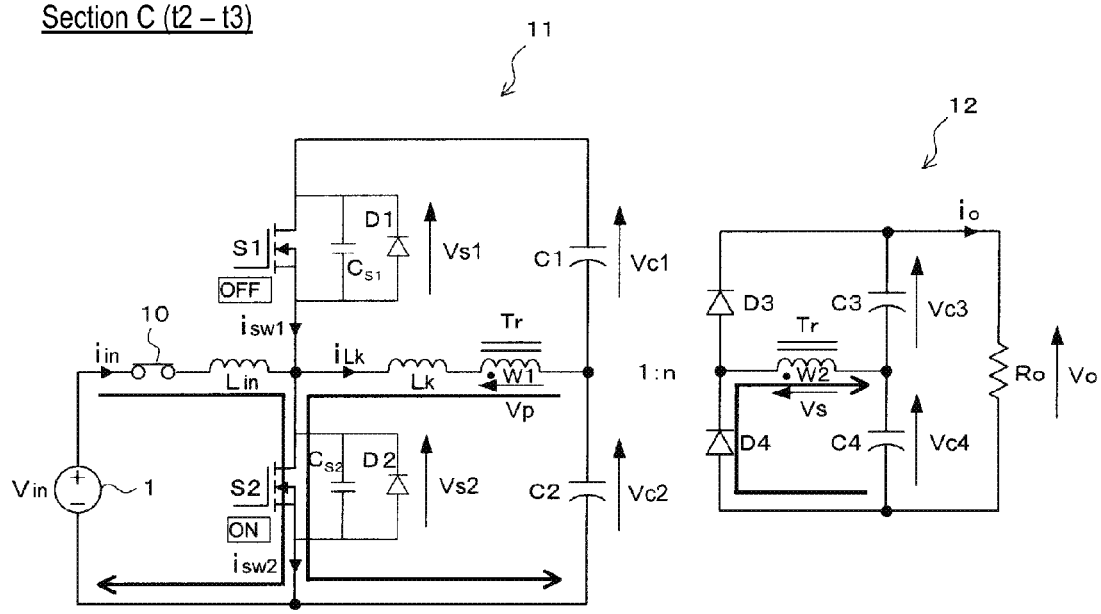
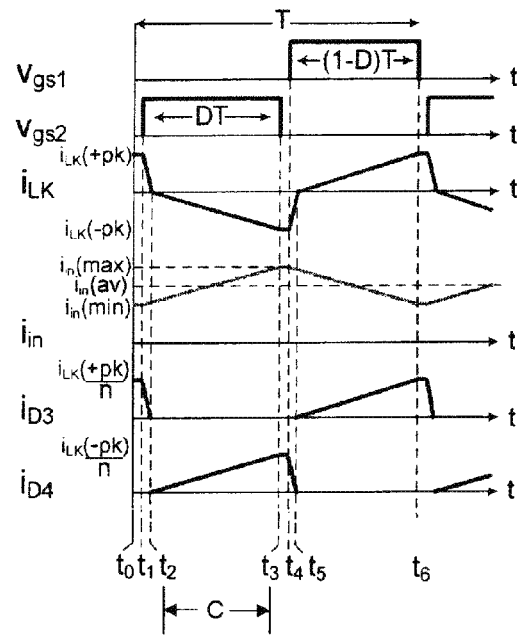

FIG. 5D
Section D (t3 – t4)
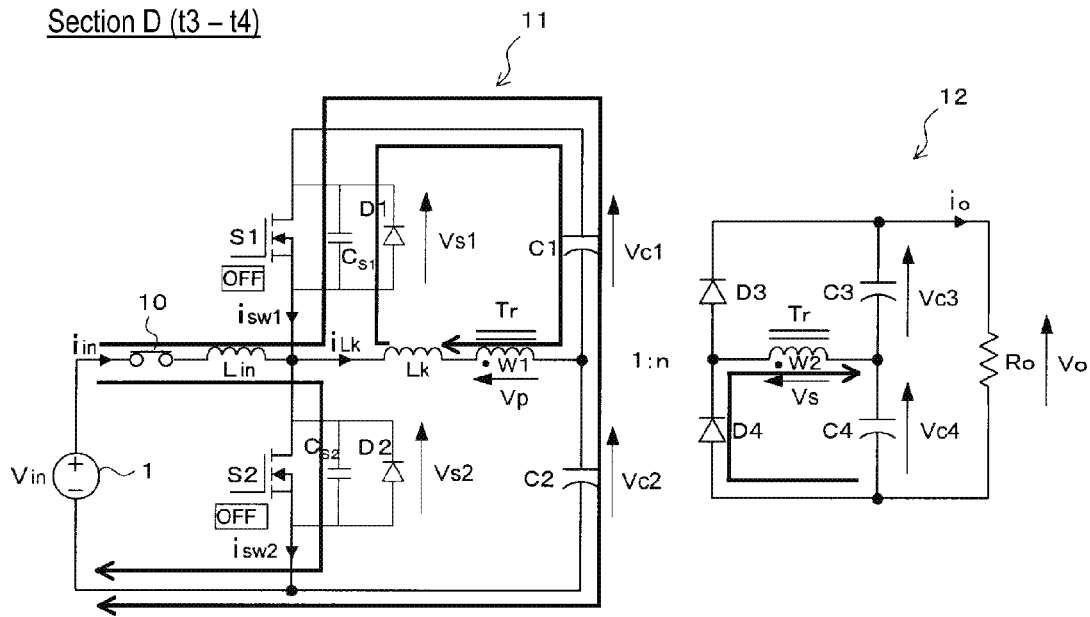
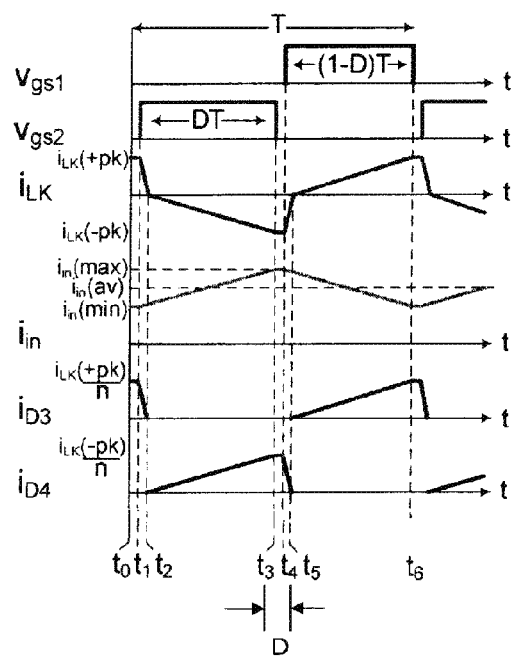

FIG. 5E
Section E (t4 – t5)
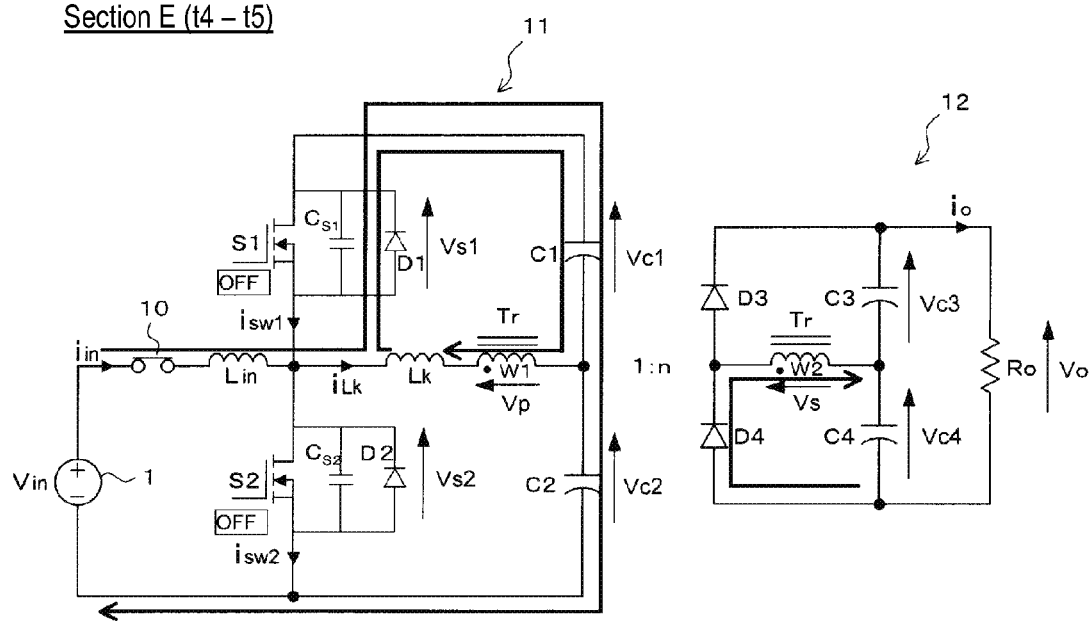
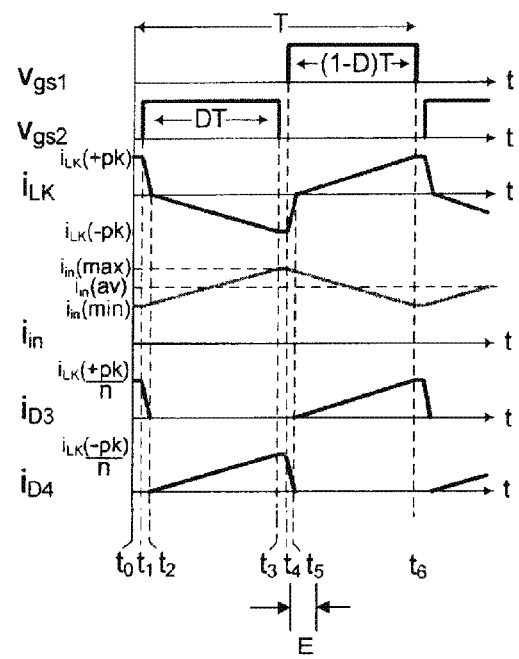

FIG. 5F
Section F (t5 – t6)
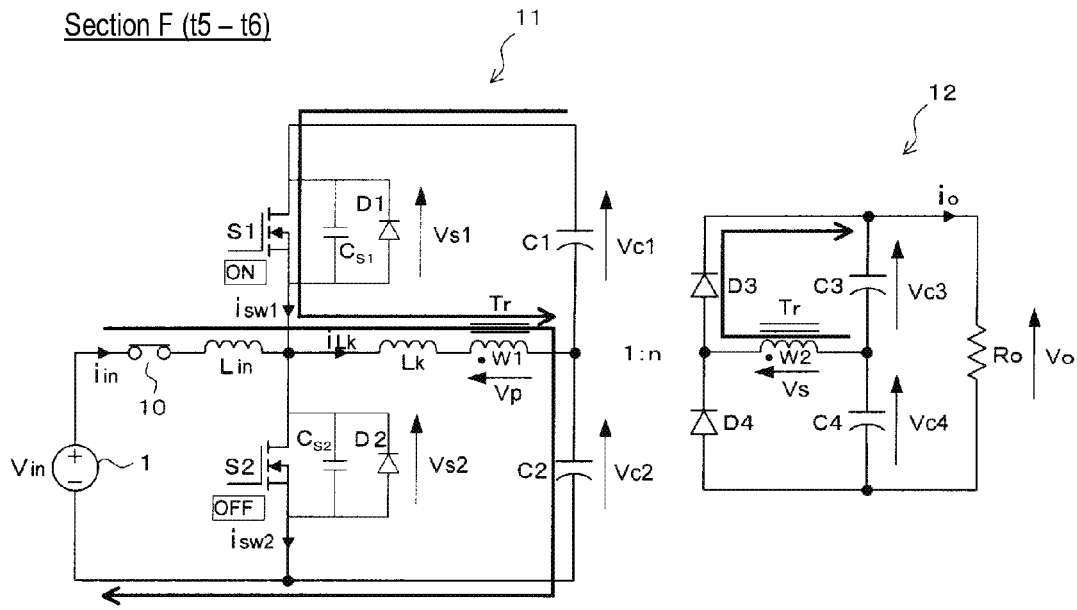
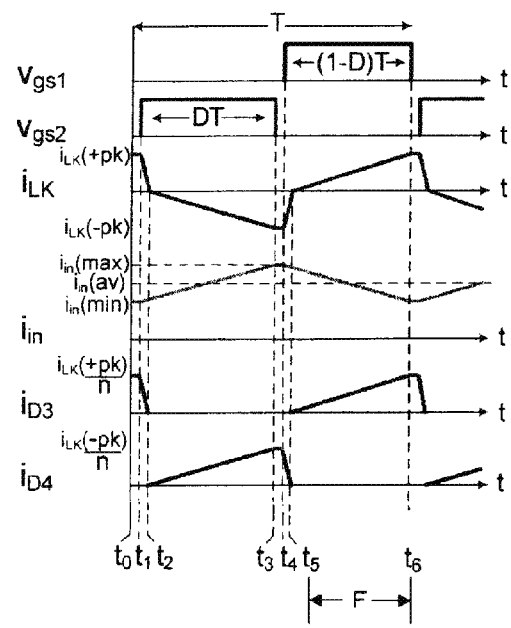

S1 becomes on failure during operation

S1 becomes off failure during operation

S2 becomes on failure during operation

S2 becomes off failure during operation

S1 and S2 become on failure during operation

S1 becomes on failure while S2 becomes off failure during operation

S1 becomes off failure while S2 becomes on failure during operation

S1 and S2 become off failure during operation

FIG. 14

<Failure determination table>

| Failure pattern | | Auxiliary switching element S1 | Main switching element S2 | Change in monitoring voltage Vm (criterion) | Determination section |
|---|---|---|---|---|---|
| 1 | Fig. 6 | On failure | Normal | Decreases rapidly to Vx (0 < Vx < Vin) | One period |
| 2 | Fig. 7 | Off failure | Normal | Increases continuously | Plural periods |
| 3 | Fig. 8 | Normal | On failure | Decreases rapidly to substantial zero | One period |
| 4 | Fig. 9 | Normal | Off failure | Decreases continuously with gradient α | Plural periods |
| 5 | Fig. 11 | On failure | Off failure | Decreases rapidly to Vin | One period |
| 6 | Fig. 12 | Off failure | On failure | Decreases rapidly to [D/(1 − D)]•Vin | One period |
| 7 | Fig. 13 | Off failure | Off failure | Decreases continuously with gradient β (β << α) | Plural periods |

US 9,966,876 B2

VOLTAGE CONVERSION DEVICE

CROSS-REFERENCE TO RELATED APPLICATION

This application is based on Japanese Patent Application No. 2016-151805 filed with the Japan Patent Office on Aug. 2, 2016, the entire contents of which are incorporated herein by reference.

FIELD

The disclosure relates to a voltage conversion device such as a DC-DC converter, particularly to a technology of detecting failure when an input-side switching element fails during operation.

BACKGROUND

For example, in an insulation type DC-DC converter in which an input side and an output side are insulated from each other, a first conversion circuit that converts a DC voltage of a DC power supply into an AC voltage by switching of the DC voltage is provided on the input side, and a second conversion circuit that converts the AC voltage converted with the first conversion circuit into a DC voltage by rectification of the AC voltage is provided on the output side. The first conversion circuit and the second conversion circuit are insulated from each other using a transformer.

There are insulation type DC-DC converters called a boost half bridge system (hereinafter, referred to as a BHB system) in which a boosting chopper (boost converter) and a half bridge type DC-DC converter are combined. U.S. Patent Publication No. 2014/0268908 (Patent Literature 1), Unexamined Japanese Patent Publication No. 2002-315324 (Patent Literature 2), Unexamined Japanese Patent Publication No. 2003-92876 (Patent Literature 3), Unexamined Japanese Patent Publication No. 2003-92877 (Patent Literature 4), Unexamined Japanese Patent Publication No. 2003-92881 (Patent Literature 5), Unexamined Japanese Patent Publication No. 2007-189835 (Patent Literature 6), Unexamined Japanese Patent Publication No. 2007-236155 (Patent Literature 7), Unexamined Japanese Patent Publication No. 2007-236156 (Patent Literature 8), Unexamined Japanese Patent Publication No. 2008-79454 (Patent Literature 9), and Unexamined Japanese Patent Publication No. 2010-226931 (Patent Literature 10), Shuai Jiang, Dong Cao, Fang Z. Peng and Yuan Li "Grid-Connected Boost-Half-Bridge Photovoltaic Micro Inverter System Using Repetitive Current Control and Maximum Power Point Tracking", 5-9 Feb. 2012, 2012 Twenty-Seventh Annual IEEE Applied Power Electronics Conference and Exposition (APEC), pp. 590-597 (Non Patent Literature 1), Dong Cao, Shuai Jiang, Fang Z. Peng and Yuan Li "Low Cost Transformer Isolated Boost Half-bridge Micro-inverter for Single-phase Grid-connected Photovoltaic System", 5-9 Feb. 2012, 2012 Twenty-Seventh Annual IEEE Applied Power Electronics Conference and Exposition (APEC), pp. 71-78 (Non Patent Literature 2), Hossein Tahmasebi, "Boost Integrated High Frequency Isolated Half-Bridge DC-DC Converter: Analysis, Design, Simulation and Experimental Results", 2015 A project Report Submitted in Partial Fulfillment of the Requirements for the Degree of MASTER OF ENGINEERING, University of Victoria (https://dspace.library.uvic.ca/bitstream/handle/1828/6427/Tahmasebi_Hossein_MEng_2015.pdf) (Non Patent Literature 3), and York Jr, John Benson, "An Isolated Micro-Converter for Next-Generation Photovoltaic Infrastructure" 2013-Apr.-19 Dissertation submitted to the Faculty of the Virginia Polytechnic Institute and State University (https://vtechworks.lib.vt.edu/bitstream/handle/10919/19326/York_JB_D_2013.pdf) (Non Patent Literature 4) disclose BHB-system insulation type DC-DC converters.

In the BHB-system insulation type DC-DC converter, a main switching element, an auxiliary switching element, an inductor, a primary winding of a transformer, and two capacitors are provided in the input-side first conversion circuit. The inductor and the main switching element are connected in series to the DC power supply, and a series circuit of the primary winding of the transformer and one of the capacitors is connected in parallel to the main switching element. A series circuit of the other capacitor and the auxiliary switching element is connected in parallel to the primary winding of the transformer.

For example, a circuit including two rectifying elements, two capacitors, and a secondary winding of a transformer as illustrated in FIG. 11 of Patent Literature 1 or a circuit including two rectifying elements, one capacitor, one inductor, and a secondary winding of a transformer having a center tap as illustrated in FIG. 1 of Patent Literature 2 is provided in the output side-second conversion circuit.

The main switching element and auxiliary switching element of the first conversion circuit are alternately turned on with a predetermined duty. The auxiliary switching element is turned off in a period in which the main switching element is turned on, and the main switching element is turned off in a period in which the auxiliary switching element is turned on. When the main switching element is turned on, the voltage at one of the capacitors is applied to the primary winding of the transformer, and power is transferred to the secondary winding of the transformer. At this point, the voltage at the primary winding is equal to the input voltage. On the other hand, when the auxiliary switching element is turned on, the voltage at the other capacitor is applied to the primary winding of the transformer, and power is transferred to the secondary winding of the transformer. At this point, the voltage at the primary winding depends on the input voltage and the duty.

Sometimes a failure occurs in the switching element during operation by some sort of causes. The failure includes an on failure in which the switching element is not turned off but remains turned on (conductive state) even if a drive voltage applied to the switching element is stopped and an off failure in which the switching element is not turned on but remains turned off (interrupted state) even if the drive voltage is applied to the switching element.

Conventionally a both-end voltage at the switching element is monitored in order to detect the failure that occurs in the switching element during operation. For example, in Unexamined Japanese Patent Publication No. 2009-112123 (Patent Literature 11), voltage at both ends of the switching element is detected, the detected voltage is sampled plural times in time series, and the sampled pieces of data are subjected to a wavelet transform. A peak value of the calculation result of the wavelet transform is compared to a reference value, and abnormality of current passed through the switching element is detected based on the comparison result.

However, in Patent Literature 11, because the abnormality is detected based on only the both-end voltage at one switching element, it is difficult to detect various failure patterns occurring in two switching elements. On the other hand, when a voltage detection circuit is provided with respect to each of the two switching elements in order to detect various failure patterns, a circuit configuration becomes complicated.

SUMMARY

An object of the disclosure is to provide a voltage conversion device that can detect various failure patterns occurring in a switching element during operation with a simple circuit configuration.

A voltage conversion device according to one or more embodiments of the disclosure includes a first conversion circuit configured to switch a DC voltage at a DC power supply to convert the DC voltage into an AC voltage and a second conversion circuit configured to rectify the AC voltage converted with the first conversion circuit to convert the AC voltage into a DC voltage. The first conversion circuit and the second conversion circuit are insulated from each other using a transformer. The first conversion circuit includes a main switching element, an auxiliary switching element, an input inductor, a primary winding of the transformer, a first capacitor, and a second capacitor. The input inductor and the main switching element are connected in series to the DC power supply, and a series circuit of the primary winding and the second capacitor is connected in parallel to the main switching element. A series circuit of the first capacitor and the auxiliary switching element is connected in parallel to the primary winding. The second conversion circuit includes a secondary winding of the transformer and a rectifying element configured to rectify an AC voltage generated in the secondary winding. The voltage conversion device further includes a voltage detection circuit configured to detect voltage at a connection point of the auxiliary switching element and the first capacitor and a failure detector configured to monitor a change in voltage at the connection point in a predetermined period, the voltage being detected with the voltage detection circuit, and to detect failure that occurs in one of or both the main switching element and the auxiliary switching element during operation based on the change in the voltage.

The voltage at the connection point of the auxiliary switching element and the first capacitor changes according to a situation of the failure that occurs in each switching element during operation. Accordingly, the change in voltage at the connection point is monitored in a predetermined period, which allows the detection of various failure patterns. It is not necessary to provide the voltage detection circuit in each of the main switching element and the auxiliary switching element, but it is only necessary to monitor the voltage at one point, which simplifies the circuit configuration.

For example, the predetermined period is a short period and a long period based on a period of a drive signal of each switching element. The failure detector detects occurrence of an on failure in which one of the switching elements remains conductive in the short period. The failure detector detects occurrence of an off failure in which one of or both the switching elements remain interrupted in the long period.

Specifically, the failure detector detects the failure of each switching element during operation in the following way.

Assuming that Vin is the DC voltage at the DC power supply, the failure detector determines that the on failure occurs in the auxiliary switching element when the voltage at the connection point decreases to a predetermined value Vx (0<Vx<Vin) in the short period.

The failure detector determines that the off failure occurs in the auxiliary switching element when the voltage at the connection point increases continuously in the long period.

The failure detector determines that the on failure occurs in the main switching element when the voltage at the connection point decreases to zero or a value close to zero in the short period.

The failure detector determines that the off failure occurs in the main switching element when the voltage at the connection point decreases continuously with a predetermined gradient α in the long period.

Assuming that Vin is the DC voltage at the DC power supply, the failure detector determines that the on failure occurs in the auxiliary switching element while the off failure occurs in the main switching element, when the voltage at the connection point decreases to Vin in the short period.

Assuming that Vin is the DC voltage at the DC power supply and that D is a duty of the main switching element, the failure detector determines that the off failure occurs in the auxiliary switching element while the on failure occurs in the main switching element, when the voltage at the connection point decreases to [D/(1−D)]·Vin in the short period.

The failure detector determines that the off failure occurs in both the main switching element and the auxiliary switching element when the voltage at the connection point decreases continuously with a predetermined gradient β (β<<α) in the long period.

The voltage conversion device according to one or more embodiments of the disclosure may further include a third conversion circuit configured to switch the DC voltage converted with the second conversion circuit to convert the DC voltage into an AC voltage.

Accordingly, the disclosure can provide the voltage conversion device that can detect various failure patterns occurring in the switching element during operation with the simple circuit configuration.

BRIEF DESCRIPTION OF THE DRAWINGS

FIG. 5A is a circuit diagram illustrating a current passage of a section A in a normal state;

FIG. 5B is a circuit diagram illustrating a current passage of a section B in the normal state;

FIG. 5C is a circuit diagram illustrating a current passage of a section C in the normal state;

FIG. 5D is a circuit diagram illustrating a current passage of a section D in the normal state;

FIG. 5E is a circuit diagram illustrating a current passage of a section E in the normal state;

FIG. 5F is a circuit diagram illustrating a current passage of a section F in the normal state;

FIG. 14 is a diagram illustrating a failure determination table; and

DETAILED DESCRIPTION

Hereinafter, a voltage conversion device according to an embodiment of the disclosure will be described with reference to the drawings. In each drawing, the identical or equivalent component is designated by the identical numeral. In embodiments of the disclosure, numerous specific details are set forth in order to provide a more through understanding of the invention. However, it will be apparent to one of ordinary skill in the art that the invention may be practiced without these specific details. In other instances, well-known features have not been described in detail to avoid obscuring the invention.

Figure 1:
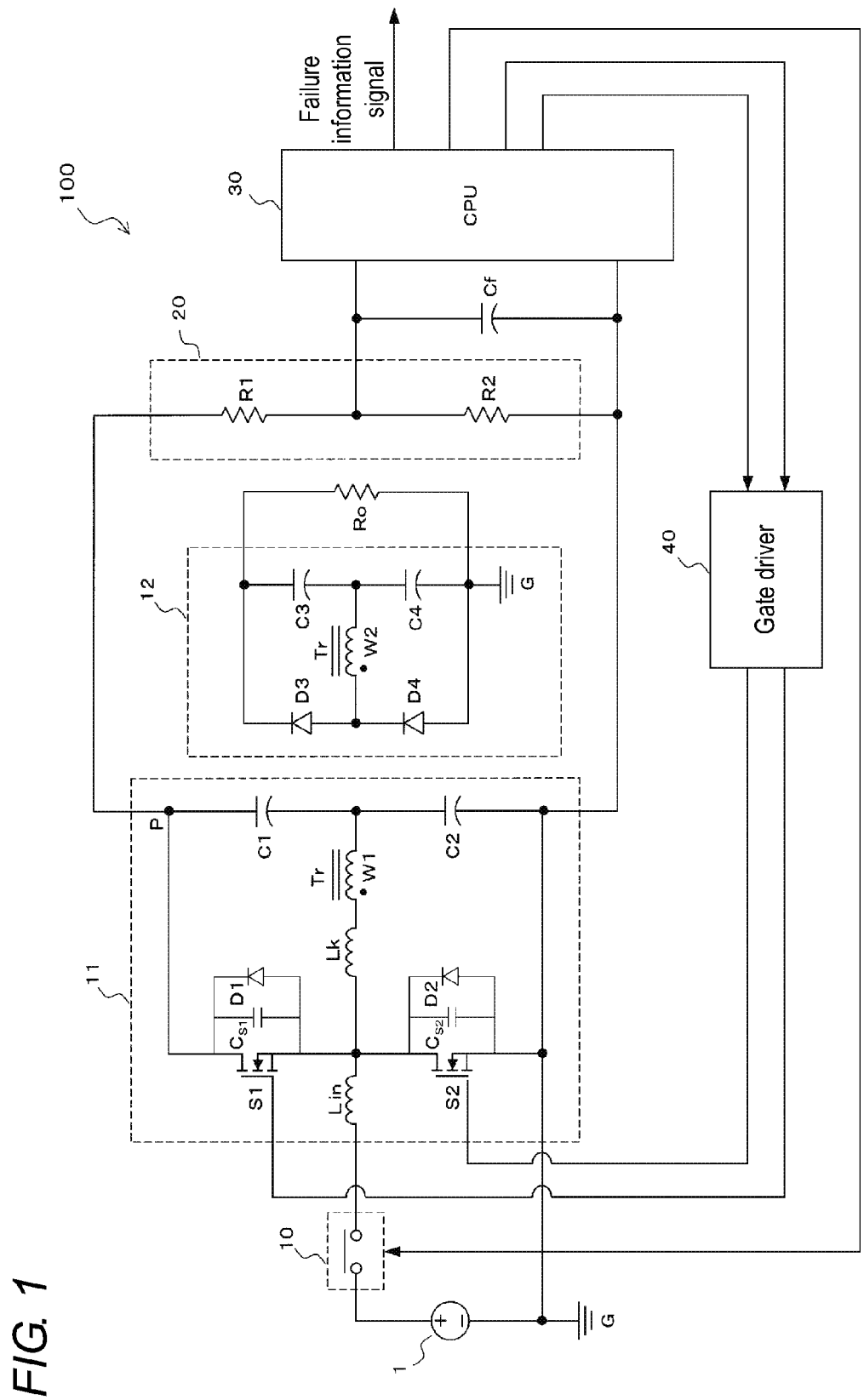
FIG. 1 is a circuit diagram illustrating a voltage conversion device according to a first embodiment of the disclosure.

A configuration of a voltage conversion device according to a first embodiment will be described below with reference to FIG. 1. Referring to FIG. 1, a voltage conversion device 100 is the BHB system insulation type DC-DC converter, and includes a relay 10, a first conversion circuit 11, a second conversion circuit 12, a CPU 30, and a gate driver 40. The first conversion circuit 11 and the second conversion circuit 12 are insulated from each other using a transformer Tr. For example, the voltage conversion device 100 is mounted on a vehicle, and used as a DC-DC converter, which boosts a battery voltage and supplies the boosted voltage to a load such as on-board equipment.

The relay 10 is connected between a positive electrode of a DC power supply 1 and the first conversion circuit 11. A negative electrode of the DC power supply 1 is connected to a grounding G. Operation of the relay 10 is controlled by a signal from the CPU 30.

The first conversion circuit 11 performs switching of a DC voltage at the DC power supply 1, and converts the DC voltage into an AC voltage while boosting the DC voltage. The first conversion circuit 11 includes an auxiliary switching element S1, a main switching element S2, an input inductor Lin, a primary winding W1 of the transformer Tr, and capacitors C1 and C2. Each of the auxiliary and main switching elements S1 and S2 is constructed with a Field Effect Transistor (FET). The capacitor C1 corresponds to a "first capacitor" according to one or more embodiments of the disclosure, and the capacitor C2 corresponds to a "second capacitor" according to one or more embodiments of the disclosure. A circuit configuration of the first conversion circuit 11 is identical to that in FIG. 2.1 of Non Patent Literature 3.

A source of the auxiliary switching element S1 is connected to a drain of the main switching element S2, and the input inductor Lin is connected between a connection point of the source of the auxiliary switching element S1 and the drain of the main switching element S2 and the relay 10.

A parallel circuit of a parasitic capacitor Cs1 and a parasitic diode D1 is equivalently connected between the drain and source of the auxiliary switching element S1. Similarly, a parallel circuit of a parasitic capacitor Cs2 and a parasitic diode D2 is equivalently connected between the drain and source of the main switching element S2. A leakage inductance Lk is equivalently connected in series to the primary winding W1 of the transformer Tr.

The drain of the auxiliary switching element S1 is connected to one end of the capacitor C1, and the other end of the capacitor C1 is connected to one end of the capacitor C2. The other end of the capacitor C2 is connected to the grounding G. A series circuit of the primary winding W1 of the transformer Tr and the leakage inductance Lk is connected between the connection point of the capacitors C1 and C2 and the connection point of the auxiliary and main switching elements S1 and S2.

Resultantly, in the first conversion circuit 11, the input inductor Lin and the main switching element S2 are connected in series to the DC power supply 1, the series circuit of the primary winding W1 and the capacitor C2 is connected in parallel to the main switching element S2, and the series circuit of the capacitor C1 and the auxiliary switching element S1 is connected in parallel to the primary winding W1.

The second conversion circuit 12 rectifies the AC voltage boosted with the first conversion circuit 11, and converts the AC voltage into the DC voltage. The second conversion circuit 12 includes a secondary winding W2 of the transformer Tr, diodes D3 and D4 that rectify the AC voltage generated in the secondary winding W2, and capacitors C3 and C4 that smooth the rectified voltage. The diodes D3 and D4 are an example of a "rectifying element" according to one or more embodiments of the disclosure. A circuit configuration of the second conversion circuit 12 is also identical to that in FIG. 2.1 of Non Patent Literature 3.

A cathode of the diode D3 is connected one end of the capacitor C3, and an anode of the diode D3 is connected to a cathode of the diode D4. An anode of the diode D4 is connected to the grounding G. The other end of the capacitor C3 is connected to one end of the capacitor C4, and the other end of the capacitor C4 is connected to the grounding G. The secondary winding W2 of the transformer Tr is connected between the connection point of the diodes D3 and D4 and the connection point of the capacitors C3 and C4. A load Ro is connected between the connection point of the diode D3 and capacitor C3 and the grounding G.

In the first conversion circuit 11, a voltage detection circuit 20 constructed with voltage dividing resistors R1 and R2 is connected between a connection point P of the auxiliary switching element S1 and capacitor C1 and the grounding G. A noise-reduction capacitor Cf is connected between the connection point of the voltage dividing resistors R1 and R2 and the grounding G. Both ends of each of the voltage dividing resistor R2 and noise-reduction capacitor Cf are connected to predetermined input ports (not illustrated) of the CPU 30.

The CPU 30 takes in output of the voltage detection circuit 20, namely, the voltage at both ends of the voltage dividing resistor R2, and monitors the voltage (a sum of the voltage at the capacitor C1 and the voltage at the capacitor C2) between the connection point P and the grounding G. Based on the monitored voltage, the CPU 30 detects failure during operation of the auxiliary and main switching elements S1 and S2. A specific failure detection method will be described in detail later. The CPU 30 provides a control signal to the gate driver 40 to perform on-off control of the auxiliary and main switching elements S1 and S2, and the CPU 30 provides a control signal to the relay 10 to perform on-off control of the relay 10. When detecting the failures of the auxiliary and main switching elements S1 and S2, the CPU 30 outputs a failure information signal to the outside for the purpose of the failure information. The CPU 30 is an example of a "failure detector" according to one or more embodiments of the disclosure.

Figures 2A, 2B:
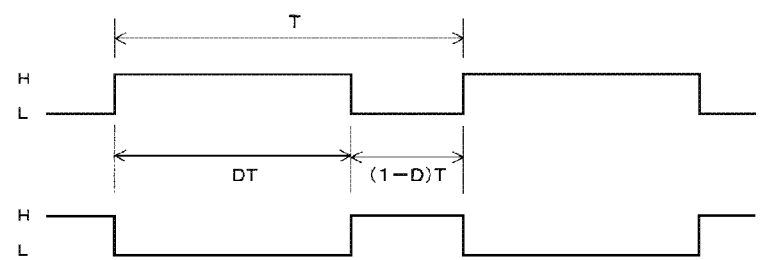
FIGS. 2A and 2B are diagrams illustrating gate signals of a main switching element S2 and an auxiliary switching element S1.

Based on the control signal from the CPU 30, the gate driver 40 generates a drive signal to turn on and off the auxiliary and main switching elements S1 and S2. For example, the drive signal is a pulse width modulation (PWM) signal having a predetermined duty, and is provided to gates of the auxiliary and main switching elements S1 and S2. FIG. 2 illustrates an example of the drive signal (gate signal). In FIG. 2, (a) illustrates the gate signal applied to the gate of the main switching element S2, and (b) illustrates the gate signal applied to the gate of the auxiliary switching element S1. T expresses a period of the gate signal and D expresses a duty. The auxiliary and main switching elements S1 and S2 are turned on when the gate signals are in an H (High)-level section, and the auxiliary and main switching elements S1 and S2 are turned off when the gate signals are in an L (Low)-level section. As described above, the auxiliary and main switching elements S1 and S2 are alternately turned on, and one of the auxiliary and main switching elements S1 and S2 is turned off when the other is turned on (although actually a dead time section is provided such that the auxiliary and main switching elements S1 and S2 are not simultaneously put into the on state, the dead time section is not illustrated in FIG. 2).

The operation of the voltage conversion device 100 described above is as follows. The relay 10 is turned on, and the gate driver 40 applies the gate signal to the gates of the auxiliary and main switching elements S1 and S2, whereby the voltage conversion device 100 starts the operation. When the auxiliary switching element S1 is turned off while the main switching element S2 is turned on, the DC power supply 1 accumulates energy in the input inductor Lin. The accumulated energy depends on a duty D of the main switching element S2. The voltage at the capacitor C2 is applied to the primary winding W1 of the transformer Tr, and is transferred to the secondary winding W2, and power is supplied to the load Ro. At this point, the voltage at the capacitor C2 is substantially equal to the voltage at the DC power supply 1.

When the main switching element S2 is turned off, boost operation is started, and the capacitors C1 and C2 are charged through the parasitic diode D1 with the energy accumulated in the input inductor Lin. Then, the voltage at the capacitor C1 is applied to the primary winding W1 of the transformer Tr by the turn-on of the auxiliary switching element S1, the boosted voltage is transferred to the secondary winding W2, and the power is supplied to the load Ro. At this point, the voltage at the capacitor C1 depends on the voltage at the DC power supply 1 and the duty D.

Figure 3:
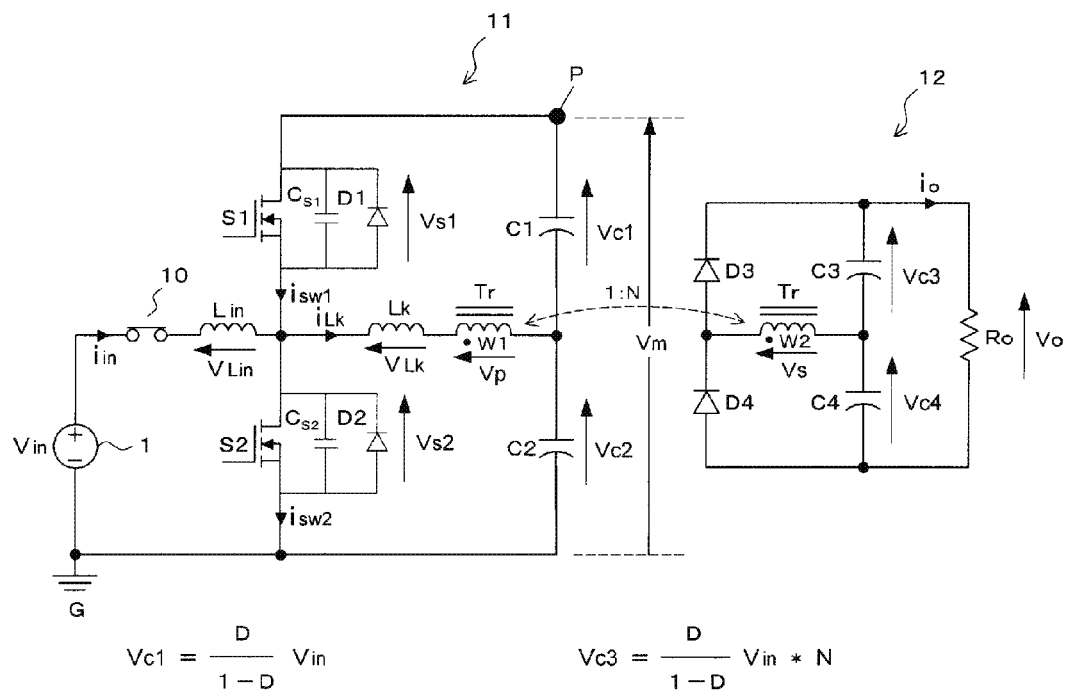
FIG. 3 is a diagram illustrating voltage and current of each unit of the voltage conversion device.

FIG. 3 illustrates voltage and current of each unit of the voltage conversion device 100. A stage subsequent to the connection point P in FIG. 1 is not illustrated in FIG. 3. FIG. 3 is basically identical to FIG. 2.1 of Non Patent Literature 3, and a definition of each numeral in FIG. 3 is as follows.

Vin: input voltage (voltage at DC power supply 1)
Vo: output voltage
Vs1: both-end voltage at auxiliary switching element S1
Vs2: both-end voltage at main switching element S2
Vc1: both-end voltage at capacitor C1
Vc2: both-end voltage at capacitor C2
Vc3: both-end voltage at capacitor C3
Vc4: both-end voltage at capacitor C4
Vm: monitoring voltage (voltage at connection point P)
Vp: both-end voltage at primary winding W1 of transformer Tr
Vs: both-end voltage at secondary winding W2 of transformer Tr
$V_{Lin}$: both-end voltage at input inductor Lin
$V_{LK}$: both-end voltage at leakage inductance Lk
$i_{in}$: input current
$i_o$: output current
$i_{SW1}$: current passed through auxiliary switching element S1
$i_{SW2}$: current passed through main switching element S2
$i_{LK}$: current passed through leakage inductance Lk In a normal state in which the relay 10 is turned on to operate the circuit, the voltages Vc1, Vc2, Vm, Vc3, and Vc4, and Vo can be calculated by the following equations as illustrated in FIG. 3. Where D is the duty in FIG. 2 and N is a turns ratio of the transformer Tr.

$$Vc1=[D/(1-D)]\cdot Vin$$

$$Vc2=Vin$$

$$Vm=Vc1+Vc2=[1/(1-D)]\cdot Vin$$

$$Vc3=Vc1\cdot N=[D/(1-D)]\cdot Vin\cdot N$$

$$Vc4=Vc2\cdot N=Vin\cdot N$$

$$Vo=Vc3+Vc4=[1/(1-D)]\cdot Vin\cdot N$$

As can be seen from the above equations, the voltage Vc2 at the capacitor C2 is equal to the input voltage Vin, and the voltage Vc1 at the capacitor C1 depends on the input voltage Vin and the duty D. As described later, in one or more embodiments of the disclosure, the failures of the auxiliary and main switching elements S1 and S2 are detected based on a change in the monitoring voltage Vm, which is a sum of voltages Vc1 and Vc2.

Figure 4:
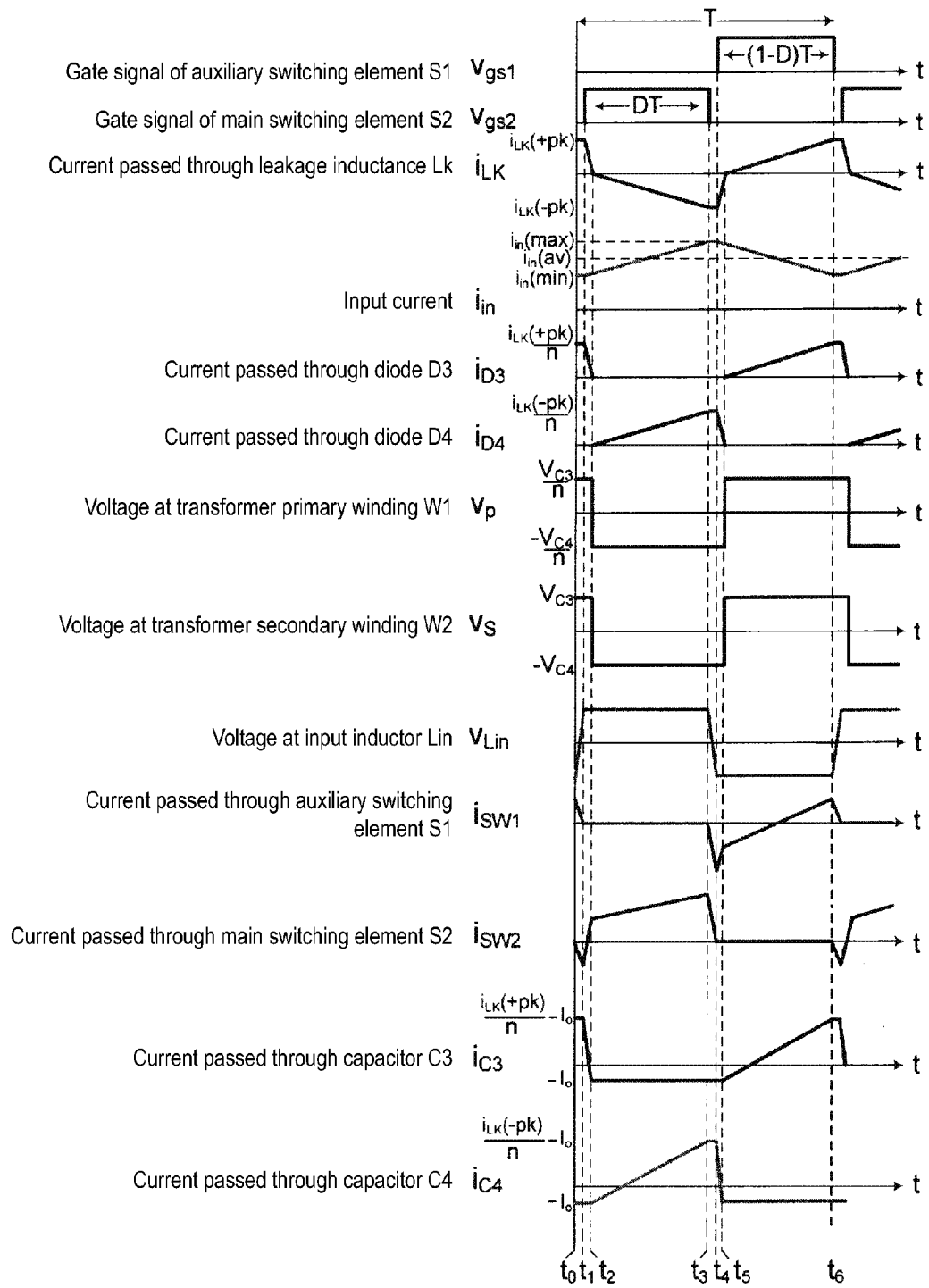
FIG. 4 is a waveform chart illustrating voltage and current of each unit of the voltage conversion device.

FIG. 4 illustrates waveforms for one period of the voltage and current with respect to each unit in FIG. 3. FIG. 2.2 of Non Patent Literature 3 is quoted to FIG. 4. In a horizontal axis, t0 to t6 express the following timings. t0 is the timing immediately after the auxiliary switching element S1 is turned off. t1 is the timing a gate signal Vgs2 of the main switching element S2 rises (becomes H from L). t2 is the timing the main switching element S2 is turned on by the gate signal Vgs2. t3 is the timing the gate signal Vgs2 of the main switching element S2 falls (becomes L from H). t4 is the timing a gate signal Vgs1 of the auxiliary switching element S1 rises (becomes H from L). t5 is the timing the auxiliary switching element S1 is turned on by the gate signal Vgs1. t6 is the timing the gate signal Vgs1 of the auxiliary switching element S1 falls (becomes L from H).

FIG. 5A to FIG. 5F illustrate current passages of the first conversion circuit 11 and second conversion circuit 12 at a given section in one period. The waveform chart below each drawing is partially extracted from the waveform chart in FIG. 4 in order to display sections A to F.

FIG. 5A illustrates the current passage at the section A (t0 to t1). At the section A, both the auxiliary and main switching elements S1 and S2 are in the off state. In the first conversion circuit 11, at the same time as the auxiliary switching element S1 is turned off, the charge of a parasitic capacitor Cs1 is started and a voltage Vs1 increases to Vc1+Vc2. On the other hand, a parasitic capacitor Cs2 of the main switching element S2 discharges and a voltage Vs2 decreases to zero. An input current $i_{in}$ becomes a minimum value, and a leakage inductance current $i_{LK}$ becomes a positive peak value. In the second conversion circuit 12, a current $i_{D3}$ passed through the diode D3 remains passed.

FIG. 5B illustrates the current passage at the section B (t1 to t2). At the section B, the auxiliary switching element S1 is maintained in the off state, and the main switching element S2 is in the state immediately before the turn-on. In the first conversion circuit 11, the parasitic diode D2 becomes conductive at the timing t1. The main switching element S2 is not turned on until the current passed through the parasitic diode D2 becomes zero. The increase in the input current $i_{in}$ starts from the minimum value, and the leakage inductance current $i_{LK}$ decreases to zero. In the second conversion circuit 12, the current $i_{D3}$ passed through the diode D3 decreases to zero.

FIG. 5C illustrates the current passage at the section C (t2 to t3). At the section C, the main switching element S2 is turned on, and the auxiliary switching element S1 is maintained in the off state. In the first conversion circuit 11, the voltage Vc2 at the capacitor C2 is applied to both ends of the series circuit of the primary winding W1 and leakage inductance Lk, and a polarity of a voltage Vp at the primary winding W1 is inverted from positive to negative (see FIG. 4). The increase in the input current $i_{in}$ is continued, and the increase in the leakage inductance current $i_{LK}$ starts from zero toward a negative direction. In the second conversion circuit 12, the diode D4 becomes conductive, and the passage of a current $i_{D4}$ through the diode D4 starts. The polarity of the voltage Vs at the secondary winding W2 is inverted from positive to negative (see FIG. 4).

FIG. 5D illustrates the current passage at the section D (t3 to t4). At the section D, the auxiliary switching element S1 is maintained in the off state, and the main switching element S2 is turned off. In the first conversion circuit 11, the parasitic capacitor Cs2 charges until Vs2=Vc1+Vc2, and the parasitic capacitor Cs1 discharges until Vs1=0. The input current $i_{in}$ becomes a maximum value, and the leakage inductance current $i_{LK}$ becomes a negative peak value. In the second conversion circuit 12, the current $i_{D4}$ is continuously passed through the diode D4.

FIG. 5E illustrates the current passage at the section E (t4 to t5). At the section E, the main switching element S2 is maintained in the off state, and the auxiliary switching element S1 is in the state immediately before the turn-on. In the first conversion circuit 11, the passage of the current through the parasitic diode D1 is started at the same time as the discharge of the parasitic capacitor Cs1 is ended. The auxiliary switching element S1 is not turned on until the current passed through the parasitic diode D1 becomes zero. The decrease in input current $i_{in}$ starts from the maximum value, and the leakage inductance current $i_{LK}$ decreases from the negative peak value to zero. In the second conversion circuit 12, the current $i_{D4}$ passed through the diode D4 decreases to zero.

FIG. 5F illustrates the current passage at the section F (t5 to t6). At the section F, the auxiliary switching element S1 is turned on, and the main switching element S2 is maintained in the off state. In the first conversion circuit 11, the input current $i_{in}$ decreases to the minimum value, and the leakage inductance current $i_{LK}$ increases from zero to the positive peak value. In the second conversion circuit 12, the diode D3 becomes conductive, and the current $i_{D3}$ is passed through the diode D3. When the auxiliary switching element S1 is turned off at the timing t6, the waveform chart returns to FIG. 5A, and the next period starts.

A failure detection method in the case that one of or both the auxiliary and main switching elements S1 and S2 fail during the operation will be described below with reference to FIGS. 6 to 13. It is assumed that Vc1=[D/(1−D)]·Vin and Vc2=Vin are the voltages Vc1 and Vc2 at the capacitors C1 and C2 before the failure occurs (normal state), respectively.

<The Case that Auxiliary Switching Element S1 Becomes on Failure>

Figure 6A:
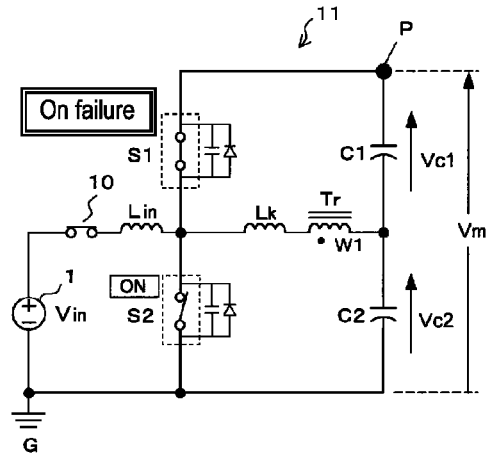
FIGS. 6A to 6C are diagrams illustrating operation when the auxiliary switching element S1 becomes an on failure during operation.
Figure 6B:
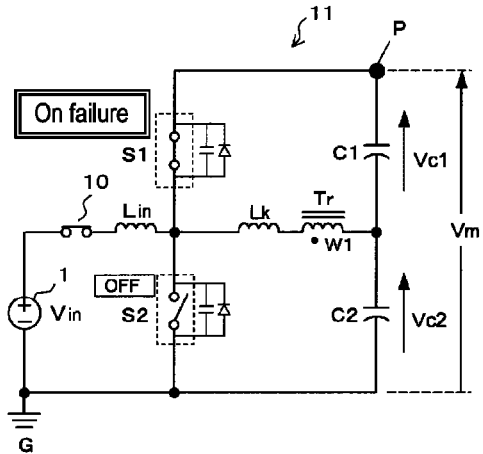
Figure 6C:
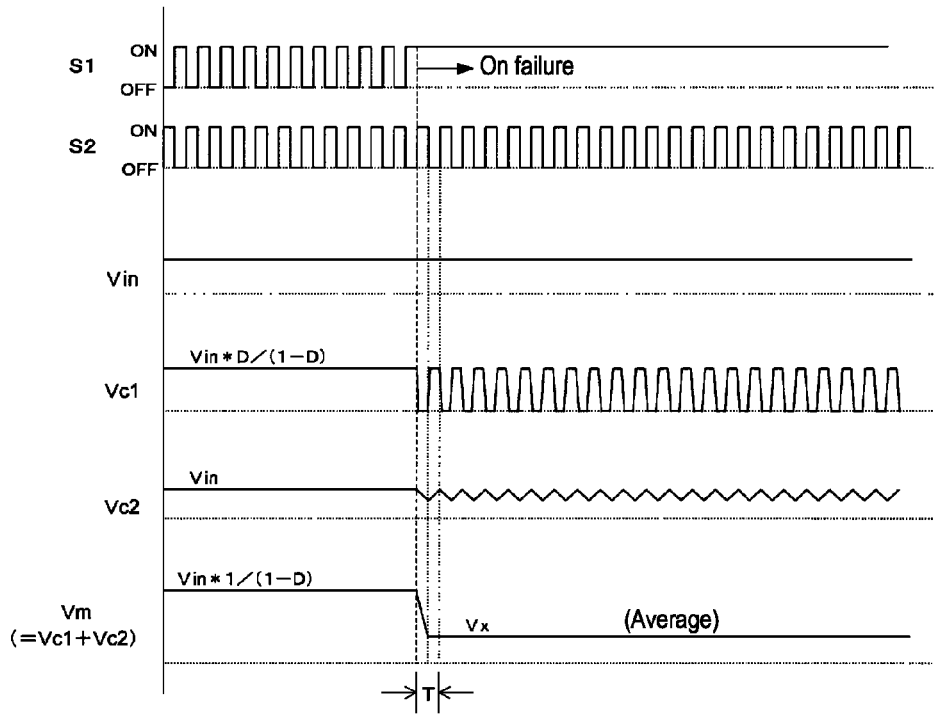

FIGS. 6A to 6C illustrate the state in which the auxiliary switching element S1 becomes the on failure during operation. At this point, the auxiliary and main switching elements S1 and S2 are indicated by simplified circuit symbols (these are also used in the drawings subsequent to FIG. 6). As illustrated in FIGS. 6A and 6B, the auxiliary switching element S1 becoming the on failure remains conductive, and the main switching element S2 can normally perform on and off operation. FIG. 6C is a timing chart illustrating the on and off operation of the auxiliary and main switching elements S1 and S2 and states of changes in the voltages Vin, Vc1, Vc2, and Vm.

When the on failure occurs in the auxiliary switching element S1, at the section where the main switching element S2 is turned on as illustrated in FIG. 6A, because the capacitor C1 is connected to the grounding G, the voltage Vc1 decreases rapidly to zero or a value close to zero (hereinafter, both zero and the value close to zero are referred to as "substantial zero") (Vc1=0, Vc1≈0). When the main switching element S2 is turned off as illustrated in FIG. 6B, the capacitor C1 is separated from the grounding G, and the voltage Vc1 returns rapidly to an initial value (Vc1=[D/(1−D)]·Vin). After this, the voltage Vc1 repeats the above change according to the turn-on and turn-off of the main switching element S2. This state is illustrated in the voltage Vc1 of FIG. 6C.

On the other hand, at the section where the main switching element S2 is turned on, because the capacitor C2 is connected to the grounding G through the primary winding W1 and leakage inductance Lk, the voltage Vc2 decreases gently from the input voltage Vin. When the main switching element S2 is turned off, the capacitor C2 is separated from the grounding G, and the voltage Vc2 returns to the input voltage Vin (Vc2=Vin). This state is illustrated in the voltage Vc2 of FIG. 6C.

Because the voltages Vc1 and Vc2 change as described above, the voltage at the connection point P, namely, the monitoring voltage Vm (=Vc1+Vc2) decreases rapidly in a first one period T as illustrated in the monitoring voltage Vm of FIG. 6C. However, because the voltage Vc2 does not become zero, the monitoring voltage Vm also does not decrease to zero, but decreases to a predetermined value Vx within a range of 0<Vx<Vin. The monitoring voltage Vm is also maintained at the predetermined value Vx on average later (in FIG. 6C, for convenience, the predetermined value Vx is expressed in terms of an average value).

At this point, one period T is set as a predetermined period in which the change in the monitoring voltage Vm is monitored. The one period T is an example of a short period according to one or more embodiments of the disclosure. The short period and a long period (described later) longer than the short period are based on a period T of the drive signals (the gate signals in FIG. 2) of the auxiliary and main switching elements S1 and S2. The short period is not limited to the one period T, but may be, for example, two periods (2T).

Thus, in the case that the auxiliary switching element S1 becomes the on failure, because the monitoring voltage Vm decreases rapidly to the predetermined value Vx (0<Vx<Vin), the both-end voltage at the voltage dividing resistor R2 (FIG. 1), namely, the output of the voltage detection circuit 20 decreases rapidly. The CPU 30 takes in the output of the voltage detection circuit 20 to analyze the change in the monitoring voltage Vm, and determines that the auxiliary switching element S1 becomes the on failure when the monitoring voltage Vm decreases to the predetermined value Vx in the one period T. Based on the determination, the CPU 30 turns off the relay 10 while issuing an instruction to the gate driver 40 to stop the gate signal. Therefore, the operation of the voltage conversion device 100 is stopped. The CPU 30 also outputs the failure information signal to the outside in order to inform the on failure of the auxiliary switching element S1.

<The Case that Auxiliary Switching Element S1 Becomes Off Failure>

Figure 7A:
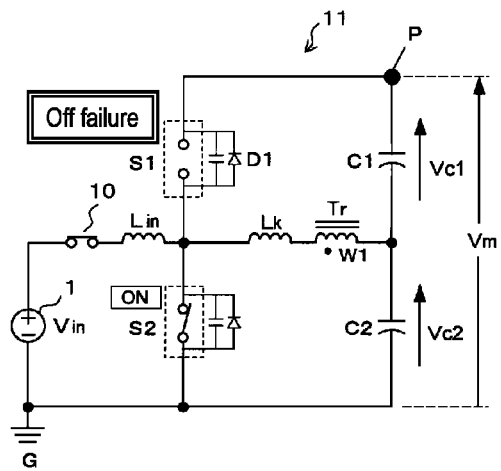
FIGS. 7A to 7C are diagrams illustrating operation when the auxiliary switching element S1 becomes an off failure during operation.
Figure 7B:
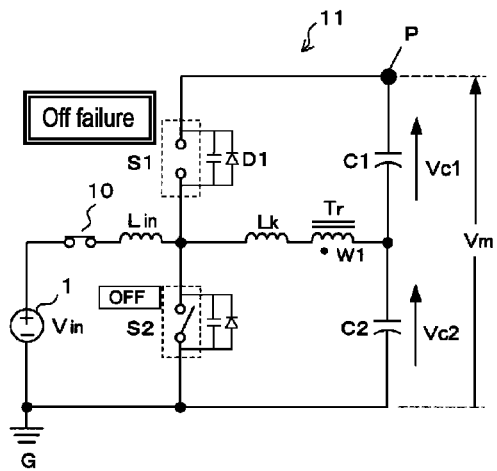
Figure 7C:
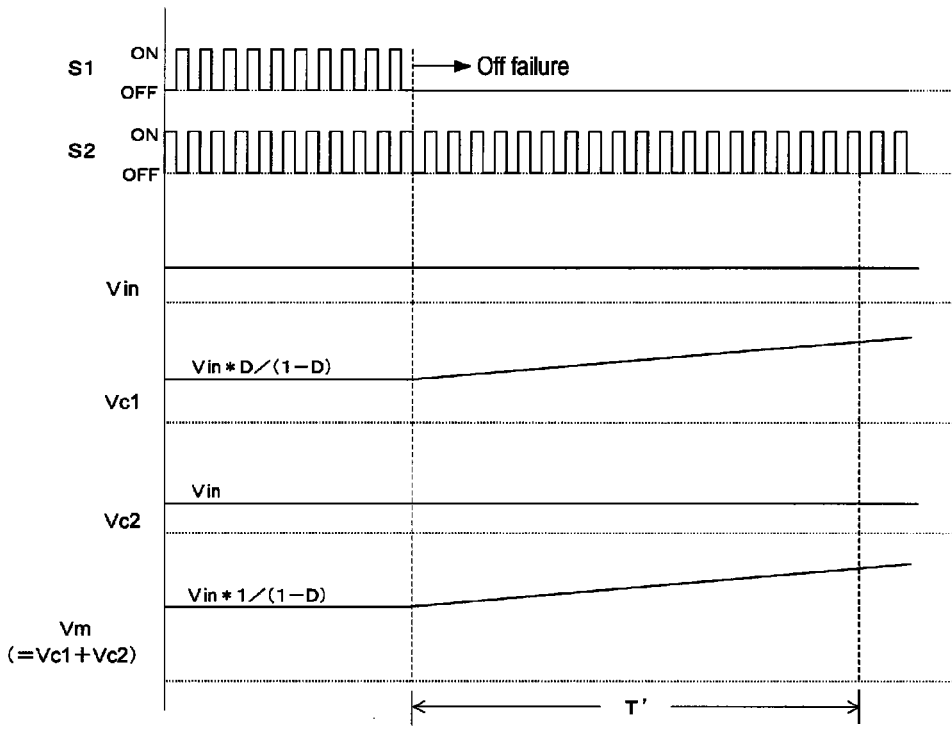

FIGS. 7A to 7C illustrate the state in which the auxiliary switching element S1 becomes the off failure during operation. As illustrated in FIGS. 7A and 7B, the auxiliary switching element S1 becoming the off failure remains interrupted, and the main switching element S2 can normally perform the on and off operation. FIG. 6C is a timing chart illustrating the on and off operation of the auxiliary and main switching elements S1 and S2 and states of changes in the voltages Vin, Vc1, Vc2, and Vm.

When the off failure occurs in the auxiliary switching element S1, a discharge passage is interrupted in the capacitor C1, and the boosted voltage by the on and off operation of the main switching element S2 is applied to the capacitor C1 through the parasitic diode D1, whereby the charging of the capacitor C1 is continued. For this reason, the voltage Vc1 at the capacitor C1 increases continuously as illustrated in FIG. 7C. On the other hand, the voltage Vc2 at the capacitor C2 is maintained in the input voltage Vin.

Resultantly, the voltage at the connection point P, namely, the monitoring voltage Vm (=Vc1+Vc2) increases continuously together with the voltage Vc1 over plural periods T' as illustrated in FIG. 7C. Even if the duty D of the main switching element S2 is reduced, the monitoring voltage Vm increases continuously. The plural periods T' are an example of the long period according to one or more embodiments of the disclosure.

Thus, in the case that the auxiliary switching element S1 becomes the off failure, the monitoring voltage Vm increases continuously. The CPU 30 takes in the output of the voltage detection circuit 20 to analyze the change in the monitoring voltage Vm, and determines that the auxiliary switching element S1 becomes the off failure when the monitoring voltage Vm increases continuously over the plural periods T'. Based on the determination, the CPU 30 turns off the relay 10 while issuing an instruction to the gate driver 40 to stop the gate signal. Therefore, the operation of the voltage conversion device 100 is stopped. The CPU 30 also outputs the failure information signal to the outside in order to inform the off failure of the auxiliary switching element S1.

<The Case that Main Switching Element S2 Becomes on Failure>

Figure 8A:
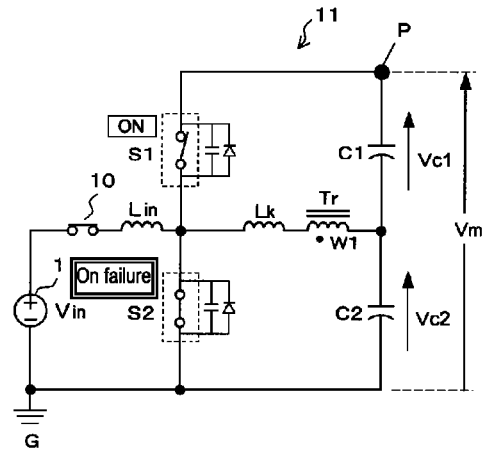
FIGS. 8A to 8C are diagrams illustrating operation when the main switching element S2 becomes an on failure during operation.
Figure 8B:
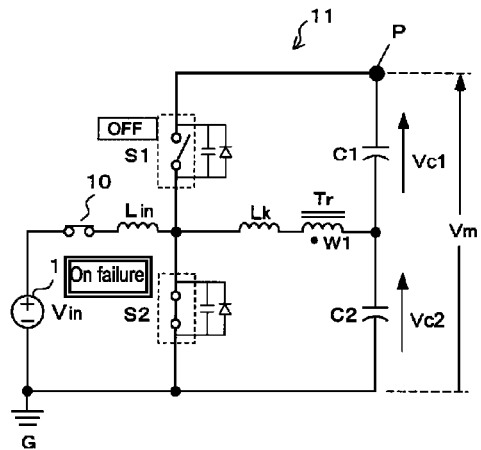
Figure 8C:
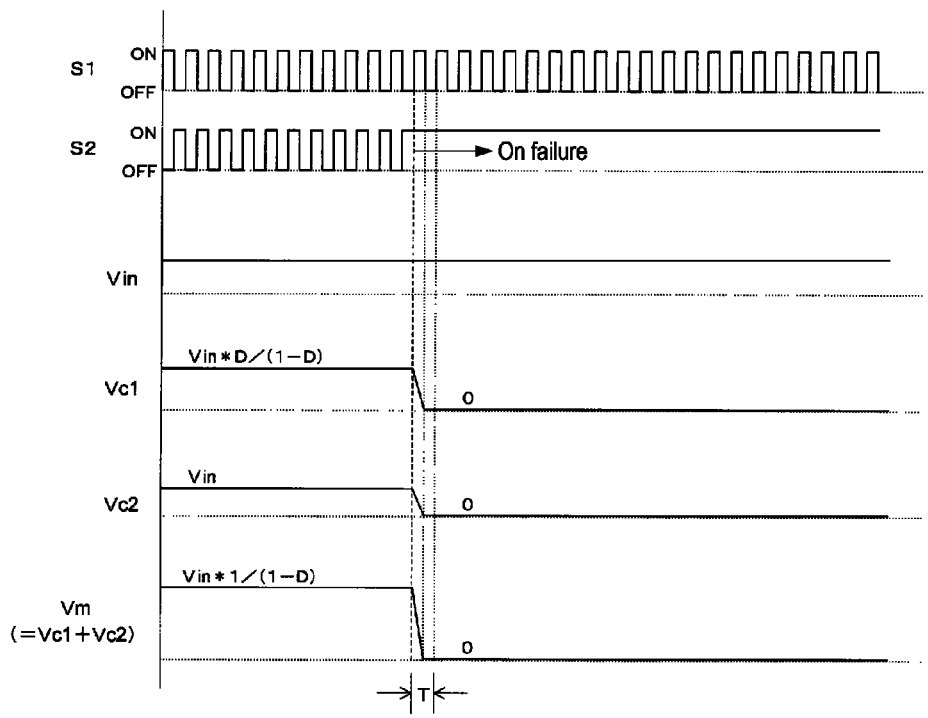

FIGS. 8A to 8C illustrate the state in which the main switching element S2 becomes the on failure during operation. As illustrated in FIGS. 8A and 8B, the main switching element S2 becoming the on failure remains conductive, and the auxiliary switching element S1 can normally perform the on and off operation. FIG. 8C is a timing chart illustrating the on and off operation of the auxiliary and main switching elements S1 and S2 and states of changes in the voltages Vin, Vc1, Vc2, and Vm.

When the on failure occurs in the main switching element S2, the capacitors C1 and C2 are connected to the grounding G at the on section (FIG. 8A) of the auxiliary switching element S1. For this reason, the voltages Vc1 and Vc2 at the capacitors C1 and C2 decrease rapidly to substantial zero as illustrated in FIG. 8C.

Resultantly, the voltage at the connection point P, namely, the monitoring voltage Vm (=Vc1+Vc2) decreases rapidly to substantial zero (Vm=0, Vm≈0) in the first one period T as illustrated in FIG. 8C.

The CPU 30 takes in the output of the voltage detection circuit 20 to analyze the change in the monitoring voltage Vm, and determines that the main switching element S2 becomes the on failure when the monitoring voltage Vm decreases to substantial zero in one period T. Based on the determination, the CPU 30 turns off the relay 10 while issuing an instruction to the gate driver 40 to stop the gate signal. Therefore, the operation of the voltage conversion device 100 is stopped. The CPU 30 also outputs the failure information signal to the outside in order to inform the on failure of the main switching element S2.

<The Case that Main Switching Element S2 Becomes Off Failure>

Figure 9A:
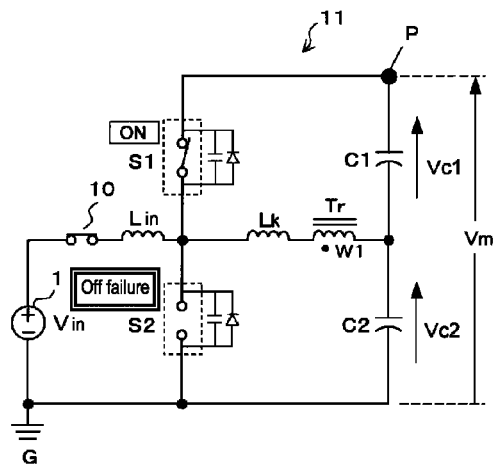
FIGS. 9A to 9C are diagrams illustrating operation when the main switching element S2 becomes an off failure during operation.
Figure 9B:
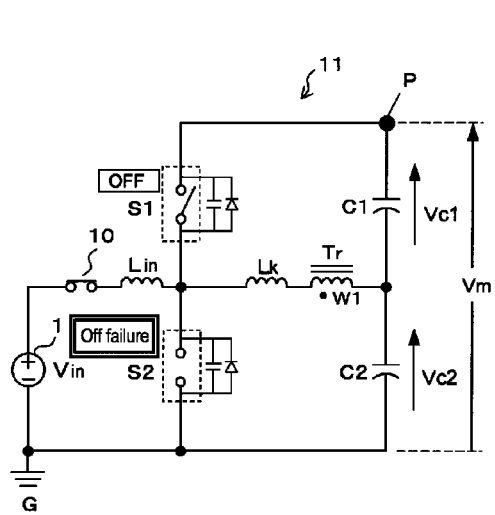
Figure 9C:
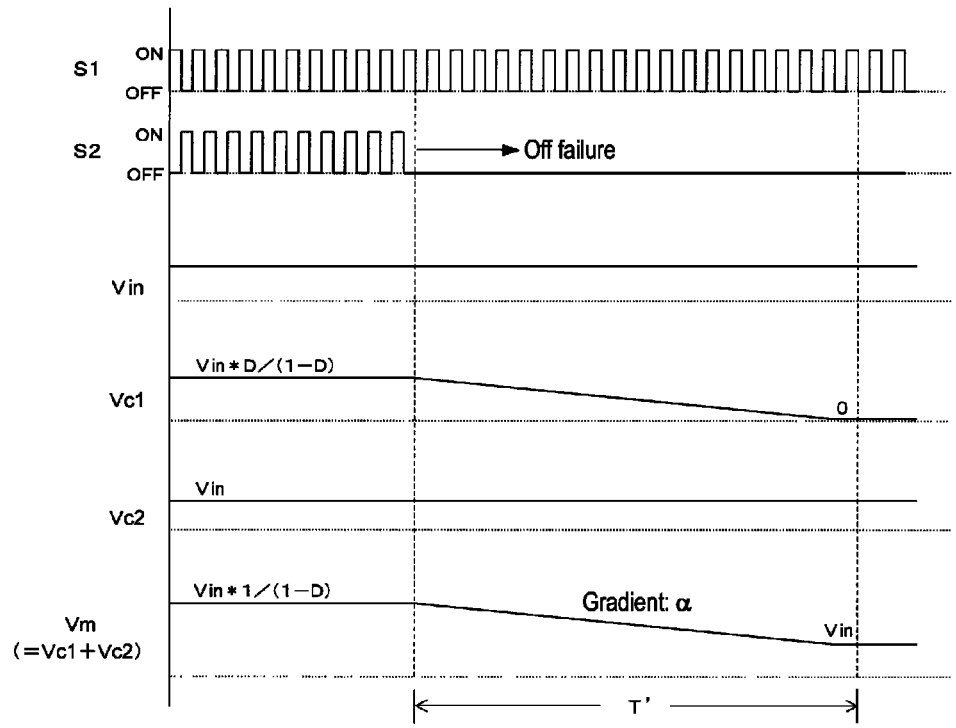

FIGS. 9A to 9C illustrate the state in which the main switching element S2 becomes the off failure during operation. As illustrated in FIGS. 9A and 9B, the main switching element S2 becoming the off failure remains interrupted, and the auxiliary switching element S1 can normally perform the on and off operation. FIG. 9C is a timing chart illustrating the on and off operation of the auxiliary and main switching elements S1 and S2 and states of changes in the voltages Vin, Vc1, Vc2, and Vm.

When the off failure occurs in the main switching element S2, at both the on section (FIG. 9A) and the off section (FIG. 9B) of the auxiliary switching element S1, the voltage Vc2 at the capacitor C2 is maintained in the input voltage Vin as illustrated in FIG. 9C. On the other hand, because the boost operation is not performed with the main switching element S2, the voltage Vc1 at the capacitor C1 decreases gradually by the discharge of the capacitor C1, and finally becomes zero as illustrated in FIG. 9C.

Resultantly, the voltage at the connection point P, namely, the monitoring voltage Vm (=Vc1+Vc2) decreases gradually with a gradient α over the plural periods T', and finally becomes the input voltage Vin as illustrated in FIG. 9C.

Thus, in the case that the main switching element S2 becomes the off failure, the monitoring voltage Vm decreases continuously. The CPU 30 takes in the output of the voltage detection circuit 20 to analyze the change in the monitoring voltage Vm, and determines that the main switching element S2 becomes the off failure when the monitoring voltage Vm decreases continuously over the plural periods T'. Based on the determination, the CPU 30 turns off the relay 10 while issuing an instruction to the gate driver 40 to stop the gate signal. Therefore, the operation of the voltage conversion device 100 is stopped. The CPU 30 also outputs the failure information signal to the outside in order to inform the off failure of the main switching element S2.

<The Case that Auxiliary and Main Switching Elements S1 and S2 Become on Failure>

Figure 10A:
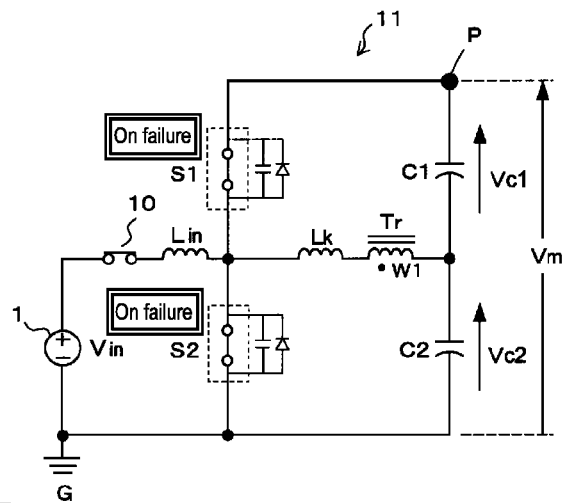
FIGS. 10A and 10B are diagrams illustrating operation when the auxiliary switching element S1 and the main switching element S2 become the on failure during operation.
Figure 10B:
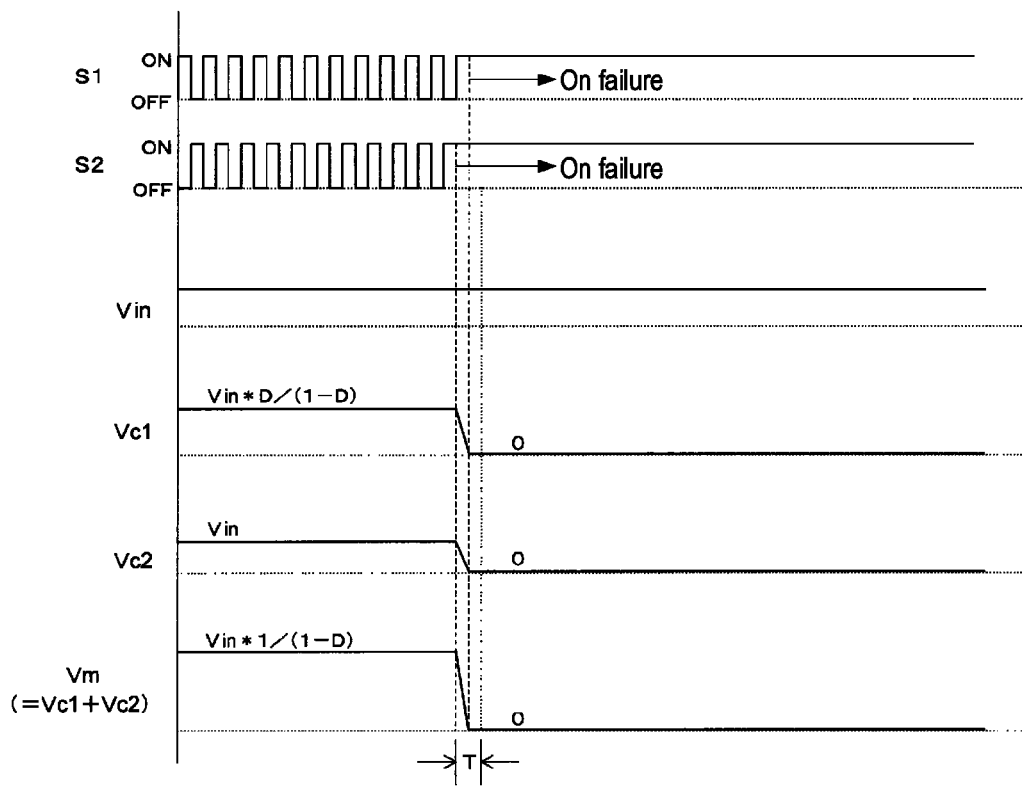

FIGS. 10A and 10B illustrate the state in which both the auxiliary and main switching elements S1 and S2 become the on failure during operation. In this case, the auxiliary and main switching elements S1 and S2 remain conductive as illustrated in FIG. 10A. FIG. 10B is a timing chart illustrating the on and off operation of the auxiliary and main switching elements S1 and S2 and states of changes in the voltages Vin, Vc1, Vc2, and Vm.

When the auxiliary and main switching elements S1 and S2 become the on failure, because both the capacitors C1 and C2 are connected to the grounding G, the voltages Vc1 and Vc2 at the capacitors C1 and C2 decrease rapidly to substantial zero as illustrated in FIG. 10B. Resultantly, the monitoring voltage Vm (=Vc1+Vc2) decreases rapidly to substantial zero (Vm=0, Vm≈0) in the first one period T as illustrated in FIG. 10B.

Thus, in the case that both the auxiliary and main switching elements S1 and S2 become the on failure, the monitoring voltage Vm decreases rapidly to substantial zero in one period. This phenomenon is identical to that in the case that the main switching element S2 becomes the on failure as illustrated in FIG. 8. Accordingly, the determination that at least the main switching element S2 becomes the on failure can be made. However, whether the auxiliary switching element S1 also becomes the on failure cannot be determined in addition to the determination that the main switching element S2 becomes the on failure. Therefore, whether the auxiliary and main switching elements S1 and S2 simultaneously become the on failure cannot be detected because the case in FIG. 10 is not distinguished from the case in FIG. 8.

<The Case that Auxiliary Switching Element S1 Becomes on Failure While Main Switching Element S2 Becomes Off Failure>

Figure 11A:
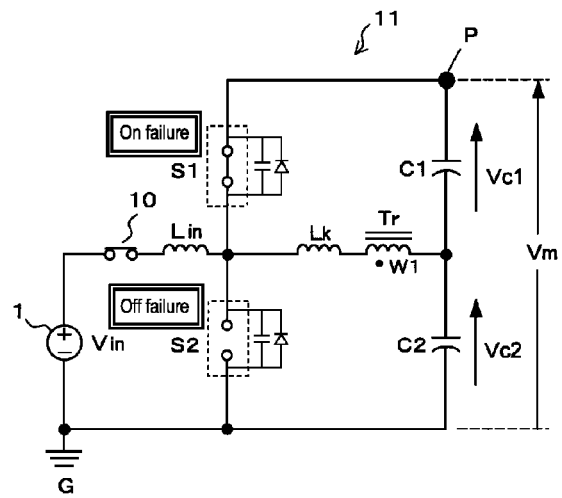
FIGS. 11A and 11B are diagrams illustrating operation when the auxiliary switching element S1 becomes the on failure while the main switching element S2 becomes the off failure during operation.
Figure 11B:
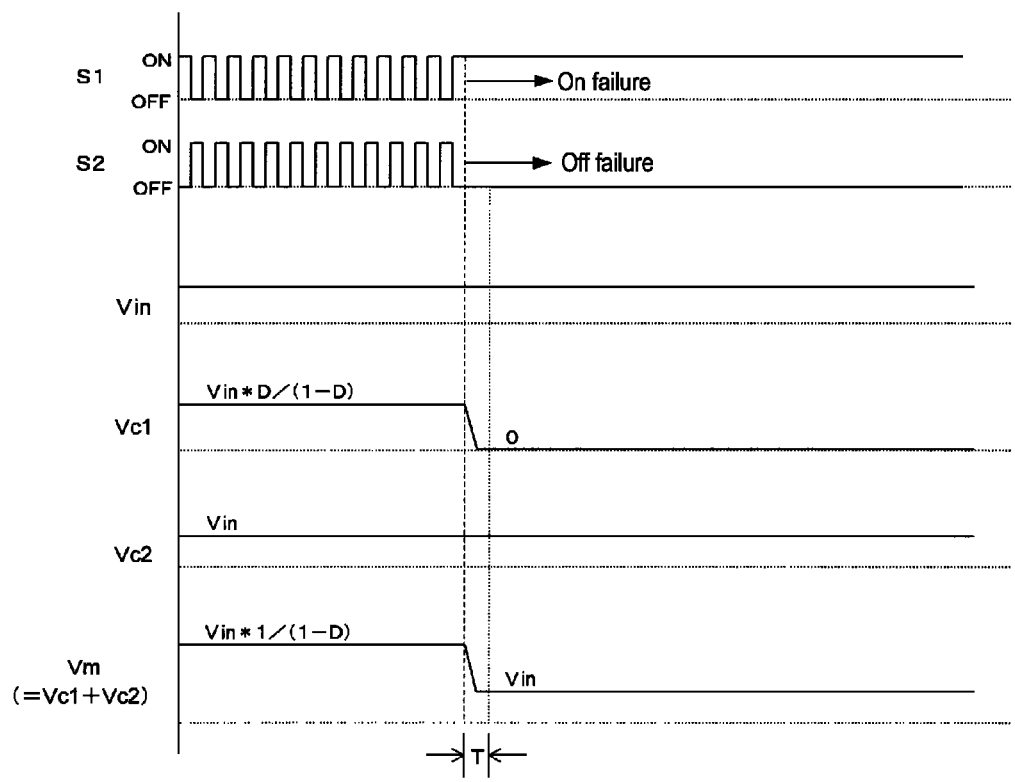

FIGS. 11A and 11B illustrate the state in which the auxiliary switching element S1 becomes the on failure while the main switching element S2 becomes the off failure during operation. As illustrated in FIG. 11A, the auxiliary switching element S1 becoming the on failure remains conductive, and the main switching element S2 becoming the off failure remains interrupted. FIG. 11B is a timing chart illustrating the on and off operation of the auxiliary and main switching elements S1 and S2 and states of changes in the voltages Vin, Vc1, Vc2, and Vm.

When the auxiliary switching element S1 becomes the on failure while the main switching element S2 becomes the off failure, as illustrated in FIG. 11B, the voltage Vc2 at the capacitor C2 is maintained in the input voltage Vin while the voltage Vc1 at the capacitor C1 becomes substantial zero by the discharge of the capacitor C1. Resultantly, the voltage at the connection point P, namely, the monitoring voltage Vm (=Vc1+Vc2) decreases to the input voltage Vin in the one period T as illustrated in FIG. 11B.

The CPU 30 takes in the output of the voltage detection circuit 20 to analyze the change in the monitoring voltage Vm, and determines that the auxiliary switching element S1 becomes the on failure while the main switching element S2 becomes the off failure when the monitoring voltage Vm decreases to the input voltage Vin in the one period T. Based on the determination, the CPU 30 turns off the relay 10 while issuing an instruction to the gate driver 40 to stop the gate signal. Therefore, the operation of the voltage conversion device 100 is stopped. The CPU 30 also outputs the failure information signal to the outside in order to inform that the auxiliary switching element S1 becomes the on failure while the main switching element S2 becomes the off failure.

<The Case that Auxiliary Switching Element S1 Becomes Off Failure While Main Switching Element S2 Becomes on Failure>

Figure 12A:
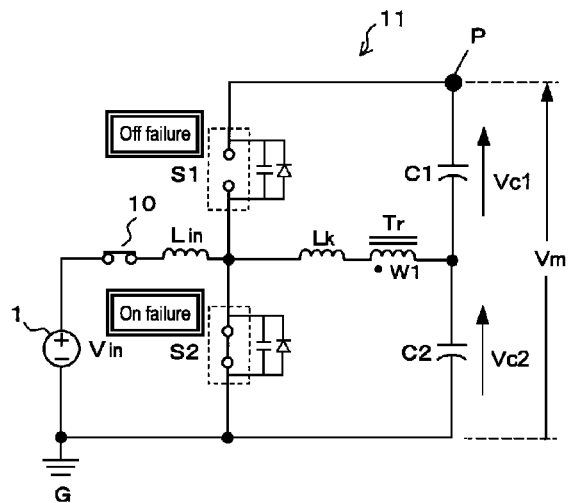
FIGS. 12A and 12B are diagrams illustrating operation when the auxiliary switching element S1 becomes the off failure while the main switching element S2 becomes the on failure during operation.
Figure 12B:
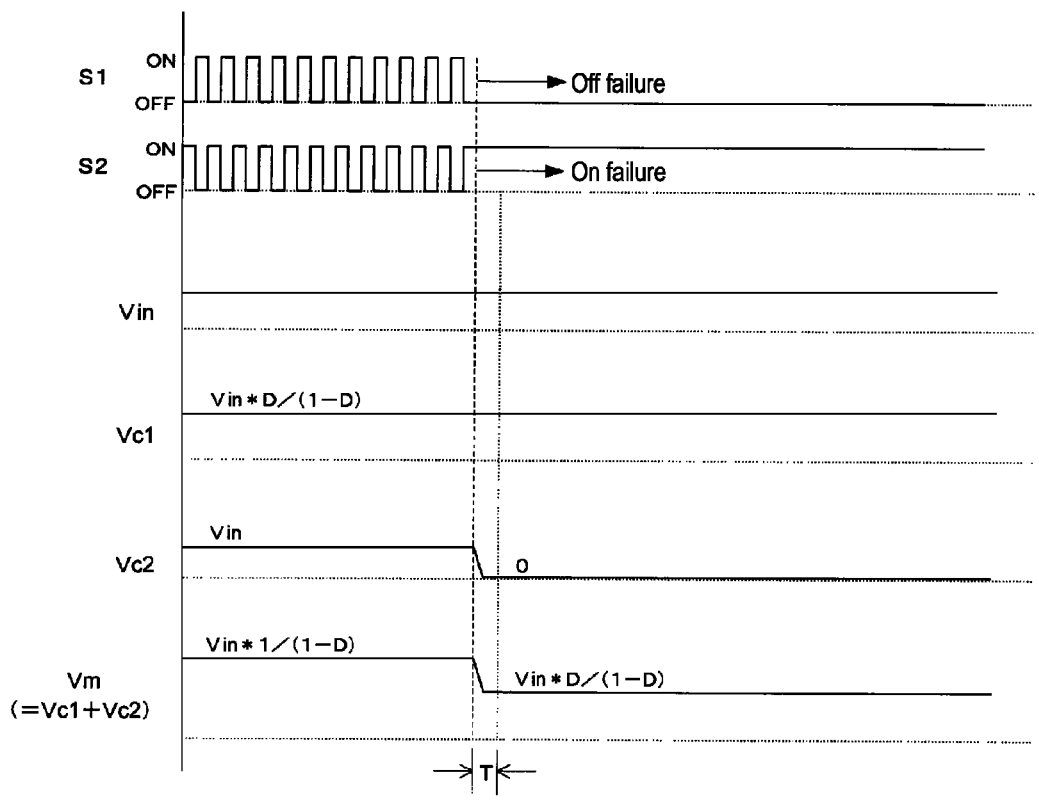

FIGS. 12A and 12B illustrate the state in which the auxiliary switching element S1 becomes the off failure while the main switching element S2 becomes the on failure during operation. As illustrated in FIG. 12A, the auxiliary switching element S1 becoming the off failure remains interrupted, and the main switching element S2 becoming the on failure remains conductive. FIG. 12B is a timing chart illustrating the on and off operation of the auxiliary and main switching elements S1 and S2 and states of changes in the voltages Vin, Vc1, Vc2, and Vm.

When the auxiliary switching element S1 becomes the off failure while the main switching element S2 becomes the on failure, because the capacitor C2 is connected to the grounding G, the voltage Vc2 at the capacitor C2 becomes substantial zero in the one period T as illustrated in FIG. 12B. On the other hand, the voltage Vc1 at the capacitor C1 is maintained as it is (Vc1=[D/(1−D)]·Vin). Even if the duty D is changed, the voltage Vc1 does not change. Resultantly, the voltage at the connection point P, namely, the monitoring voltage Vm (=Vc1+Vc2) decreases to [D/(1−D)]·Vin in the one period T as illustrated in FIG. 12B.

The CPU 30 takes in the output of the voltage detection circuit 20 to analyze the change in the monitoring voltage Vm, and determines that the auxiliary switching element S1 becomes the off failure while the main switching element S2 becomes the on failure when the monitoring voltage Vm decreases to [D/(1−D)]·Vin in the one period T. Based on the determination, the CPU 30 turns off the relay 10 while issuing an instruction to the gate driver 40 to stop the gate signal. Therefore, the operation of the voltage conversion device 100 is stopped. The CPU 30 also outputs the failure information signal to the outside in order to inform that the auxiliary switching element S1 becomes the off failure while the main switching element S2 becomes the on failure.

<The Case that Auxiliary and Main Switching Elements S1 and S2 Become Off Failure>

Figure 13A:
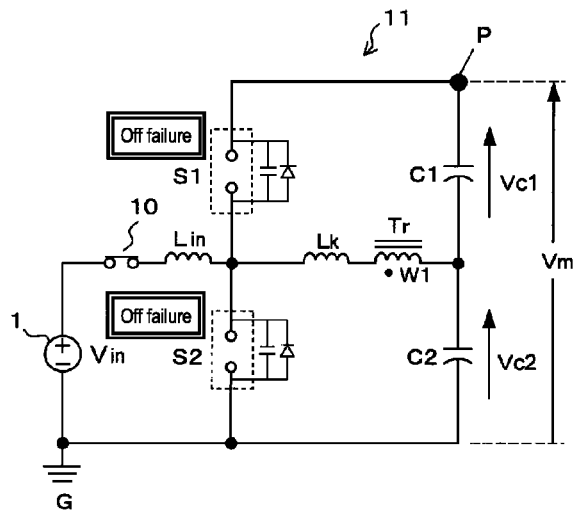
FIGS. 13A and 13B are diagrams illustrating operation when the auxiliary switching element S1 and the main switching element S2 become the off failure during operation.
Figure 13B:
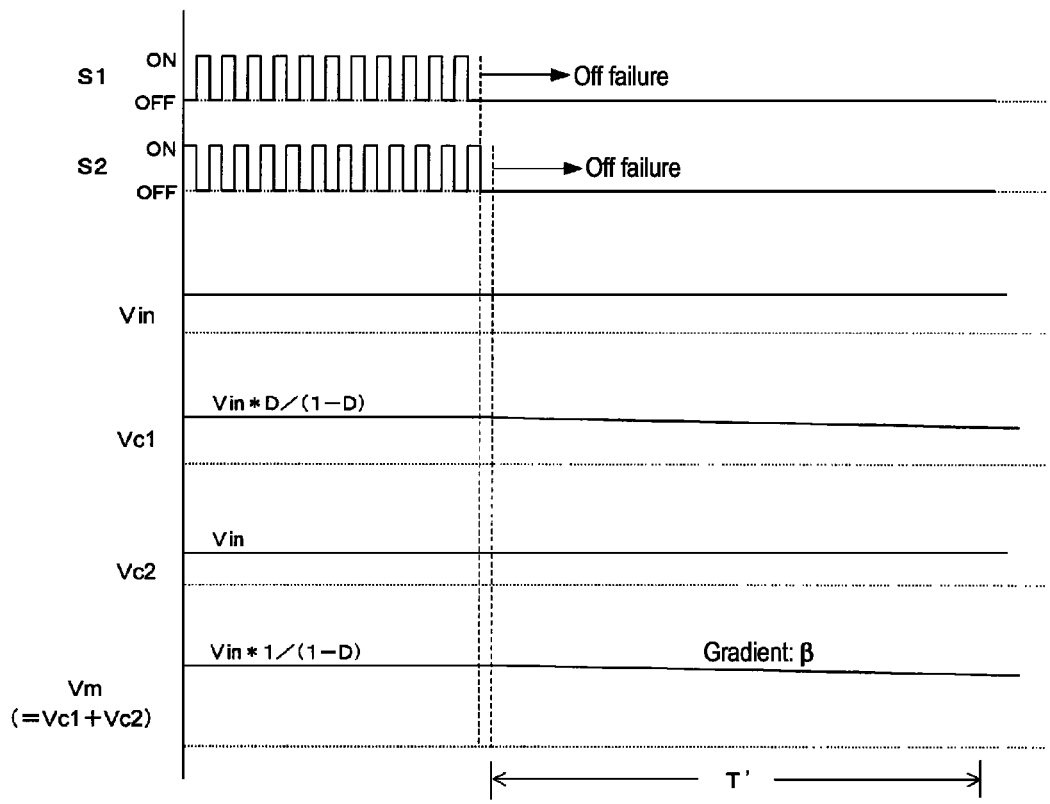

FIGS. 13A and 13B illustrate the state in which both the auxiliary and main switching elements S1 and S2 become the off failure during operation. In this case, the auxiliary and main switching elements S1 and S2 remain interrupted as illustrated in FIG. 13A. FIG. 13B is a timing chart illustrating the on and off operation of the auxiliary and main switching elements S1 and S2 and states of changes in the voltages Vin, Vc1, Vc2, and Vm.

When the off failure occurs in the auxiliary and main switching elements S1 and S2, the voltage Vc2 at the capacitor C2 is maintained in the input voltage Vin as illustrated in FIG. 13B. On the other hand, the voltage Vc1 at the capacitor C1 decreases slowly by the discharge of the capacitor C1. Even if the duty D is changed, the voltage Vc1 is not affected.

Resultantly, the monitoring voltage Vm (=Vc1+Vc2) decreases gradually together with the voltage Vc1 over the plural periods T' as illustrated in FIG. 13B. At this point, because a gradient β of the monitoring voltage Vm is sufficiently smaller than the gradient α of the monitoring voltage Vm in FIG. 9 (β<<α), the failure in FIG. 13 can be distinguished from the failure in FIG. 9.

The CPU 30 takes in the output of the voltage detection circuit 20 to analyze the change in the monitoring voltage Vm, and determines that both the auxiliary and main switching elements S1 and S2 become the off failure when the monitoring voltage Vm decreases slowly over the plural periods T'. Based on the determination, the CPU 30 turns off the relay 10 while issuing an instruction to the gate driver 40 to stop the gate signal. Therefore, the operation of the voltage conversion device 100 is stopped. The CPU 30 also outputs the failure information signal to the outside in order to inform the off failure of the auxiliary and main switching elements S1 and S2.

FIG. 14 is a failure determination table illustrating the above failure patterns together with criteria. As described above, the failure pattern in FIG. 10 is not listed in the failure determination table because the failure pattern in FIG. 10 is not distinguished from the failure pattern in FIG. 8.

In the first embodiment, the voltage (monitoring voltage Vm) is detected at the connection point P of the auxiliary switching element S1 and the capacitor C1, and the failures of the auxiliary and main switching elements S1 and S2 are detected based on the change in voltage in the predetermined period. Therefore, various failure patterns, such as an on failure and an off failure, which occur in auxiliary and main switching elements S1 and S2 during operation, can be detected only by the monitoring of the voltage at one point.

It is not necessary to provide the voltage detection circuit in each of the auxiliary and main switching elements S1 and S2, which simplifies the circuit configuration. Particularly, in detecting the both-end voltage at the upper-side auxiliary switching element S1, a device for the voltage detection circuit is required because the auxiliary switching element S1 is not connected to the grounding G. However, in the first embodiment, the failure of the auxiliary switching element S1 can be detected even if the both-end voltage at the auxiliary switching element S1 is not detected.

Figure 15:
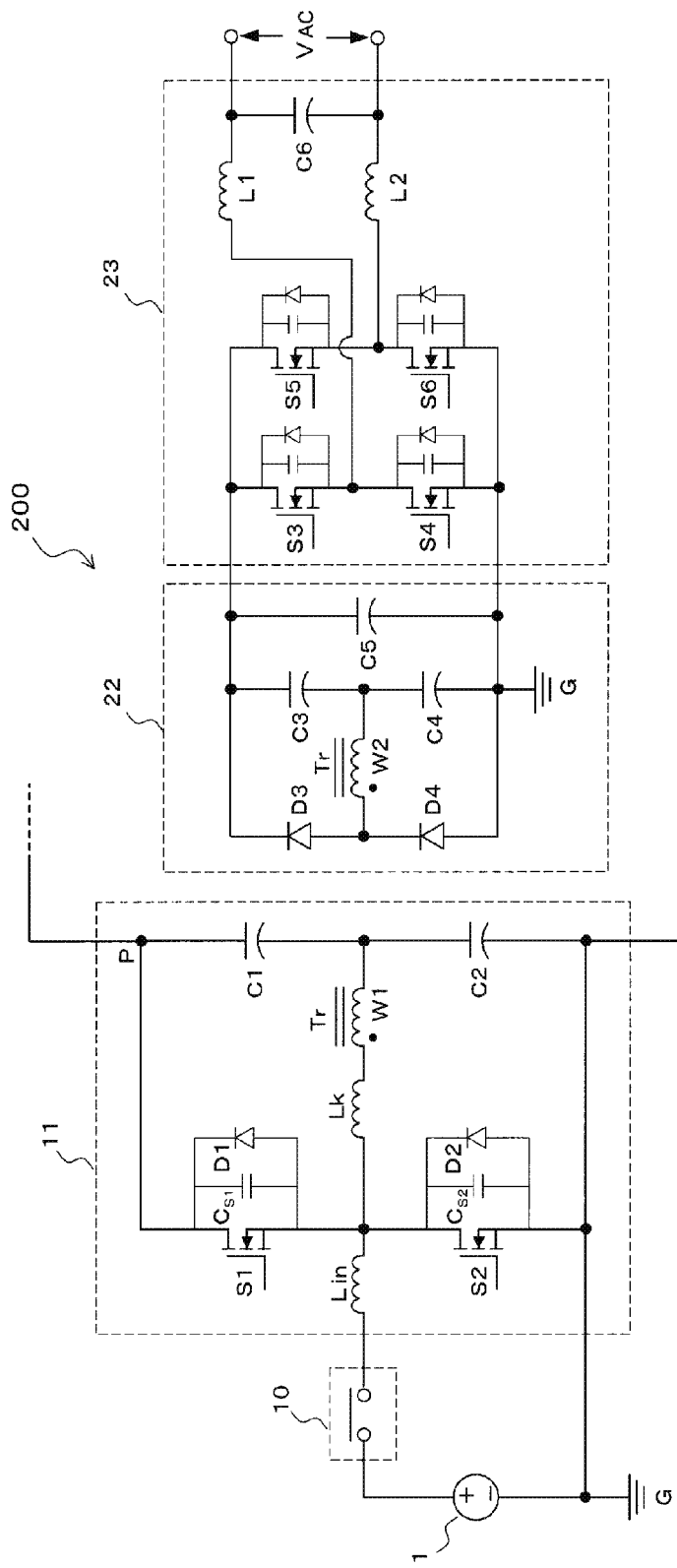
FIG. 15 is a circuit diagram illustrating a voltage conversion device according to a second embodiment of the disclosure.

FIG. 15 illustrates a voltage conversion device 200 according to a second embodiment. The voltage conversion device 100 (FIG. 1) of the first embodiment is the DC-DC converter. On the other hand, the voltage conversion device 200 according to the second embodiment is a DC-AC converter. A stage subsequent to the connection point P is not illustrated in FIG. 15. At the stage subsequent to the connection point P, the voltage detection circuit 20, the noise-reduction capacitor Cf, the CPU 30, and the gate driver 40 are provided in the same circuit configuration as that in FIG. 1.

In FIG. 15, the voltage conversion device 200 includes the DC power supply 1, the relay 10, the first conversion circuit 11, a second conversion circuit 22, and a third conversion circuit 23. Because the DC power supply 1, the relay 10, and the first conversion circuit 11 are identical to those in FIG. 1, the description is omitted.

The second conversion circuit 22 rectifies the AC voltage boosted with the first conversion circuit 11, and converts the AC voltage into the DC voltage. The second conversion circuit 22 includes rectifying diodes D3 and D4, smoothing capacitors C3 to C5, and the secondary winding W2 of the transformer Tr.

The third conversion circuit 23 converts the DC voltage obtained with the second conversion circuit 22 into the AC voltage by switching of the DC voltage. The third conversion circuit 23 includes switching elements S3 to S6, inductors L1 and L2, and a capacitor C6. The switching elements S3 to S6 are constructed with the FETs similarly to the auxiliary and main switching elements S1 and S2.

For example, Non Patent Literature 1 discloses a voltage conversion device (DC-AC converter) including three conversion circuits 11, 22, and 23.

In the voltage conversion device 200 described above, various failure patterns that occur in the auxiliary and main switching elements S1 and S2 during operation can be detected based on the change in voltage (monitoring voltage) at the connection point P. The relay 10 is turned on in an initial state, and the change in voltage at the connection point P is monitored, which allows performance of an initial diagnosis. Because these techniques are similar to those for the voltage conversion device 100 of the first embodiment, the overlapping description is omitted.

In addition to the above embodiments, various embodiments can be made in the disclosure.

In the second conversion circuit 12 of the voltage conversion device 100, a center tap is provided in the secondary winding W2 of the transformer Tr instead of the configuration in FIG. 1, and a secondary-side circuit may be configured as disclosed in Patent Literatures 2-10. The same holds true for the second conversion circuit 22 of the voltage conversion device 200.

In illustrative embodiments, the diodes D3 and D4 are used as the rectifying elements of the second conversion circuits 12 and 22. Alternatively, an FET may be used instead of the diode.

In illustrative embodiments, the FETs are used as the auxiliary and main switching elements S1 and S2. Alternatively, a transistor or an IGBT may be used instead of the FET. The same holds true for the switching elements S3 to S6 of the voltage conversion device 200.

In illustrative embodiments, the relay 10 is cited as an example of the switch provided between the DC power supply 1 and the first conversion circuit 11. Alternatively, a switch, an FET, or a transistor may be used instead of the relay 10.

In illustrative embodiments, when detecting the failure of the auxiliary and main switching elements S1 and S2, the CPU 30 issues the instruction to the gate driver 40 to stop the gate signal, and turns off the relay 10. Alternatively, when detecting the failure of the auxiliary and main switching elements S1 and S2, the CPU 30 may issue the instruction to the gate driver 40 to stop the gate signal, or turn off the relay 10.

In illustrative embodiments, the auxiliary and main switching elements S1 and S2 are driven using the PWM signal. Alternatively, the auxiliary and main switching elements S1 and S2 may be driven using a signal except for the PWM signal.

In illustrative embodiments, the voltage conversion device mounted on the vehicle is cited by way of example. However, one or more embodiments of the disclosure are also applicable to a voltage conversion device for any objects in addition to the vehicle.

While the invention has been described with reference to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A voltage conversion device comprising:
   a first conversion circuit configured to switch a DC voltage at a DC power supply to convert the DC voltage into an AC voltage;
   a second conversion circuit configured to rectify the AC voltage converted with the first conversion circuit to convert the AC voltage into a DC voltage,
   the first conversion circuit and the second conversion circuit being insulated from each other using a transformer,
   the first conversion circuit comprising a main switching element, an auxiliary switching element, an input inductor, a primary winding of the transformer, a first capacitor, and a second capacitor,
   the input inductor and the main switching element being connected in series to the DC power supply,
   a series circuit of the primary winding and the second capacitor being connected in parallel to the main switching element,
   a series circuit of the first capacitor and the auxiliary switching element being connected in parallel to the primary winding,
   the second conversion circuit comprising a secondary winding of the transformer and a rectifying element configured to rectify an AC voltage generated in the secondary winding;
   a voltage detection circuit configured to detect voltage at a connection point of the auxiliary switching element and the first capacitor; and
   a failure detector configured to monitor a change in voltage at the connection point in a predetermined period, the voltage being detected with the voltage detection circuit, and to detect failure that occurs in one of or both the main switching element and the auxiliary switching element during operation based on the change in voltage.

2. The voltage conversion device according to claim 1,
   wherein the predetermined period is a short period and a long period based on a period of a drive signal of each of the main switching element and the auxiliary switching element,
   wherein the failure detector detects occurrence of an on failure in which one of the main switching element and the auxiliary switching element remains conductive in the short period, and
   wherein the failure detector detects occurrence of an off failure in which one of or both the main switching element and the auxiliary switching element remain interrupted in the long period.

3. The voltage conversion device according to claim 2,
   wherein assuming that Vin is the DC voltage at the DC power supply, and
   wherein the failure detector determines that the on failure occurs in the auxiliary switching element when the voltage at the connection point decreases to a predetermined value Vx (0<Vx<Vin) in the short period.

4. The voltage conversion device according to claim 2,
   wherein the failure detector determines that the off failure occurs in the auxiliary switching element when the voltage at the connection point increases continuously in the long period.

5. The voltage conversion device according to claim 2,
   wherein the failure detector determines that the on failure occurs in the main switching element when the voltage at the connection point decreases to zero or a value close to zero in the short period.

6. The voltage conversion device according to claim 2,
   wherein the failure detector determines that the off failure occurs in the main switching element when the voltage at the connection point decreases continuously with a predetermined gradient α in the long period.

7. The voltage conversion device according to claim 2,
   wherein assuming that Vin is the DC voltage at the DC power supply, and
   wherein the failure detector determines that the on failure occurs in the auxiliary switching element while the off failure occurs in the main switching element, when the voltage at the connection point decreases to Vin in the short period.

8. The voltage conversion device according to claim 2,
   wherein assuming that Vin is the DC voltage at the DC power supply and that D is a duty of the main switching element, and
   wherein the failure detector determines that the off failure occurs in the auxiliary switching element while the on failure occurs in the main switching element, when the voltage at the connection point decreases to $[D/(1-D)] \cdot Vin$ in the short period.

9. The voltage conversion device according to claim 2,
   wherein the failure detector determines that the off failure occurs in both the main switching element and the auxiliary switching element when the voltage at the connection point decreases continuously with a predetermined gradient β (β<<α) in the long period.

10. The voltage conversion device according to claim 1, further comprising
    a third conversion circuit configured to switch the DC voltage converted with the second conversion circuit to convert the DC voltage into an AC voltage.

* * * * *